US012388601B2

(12) United States Patent
Yunusov et al.

(10) Patent No.: US 12,388,601 B2
(45) Date of Patent: Aug. 12, 2025

(54) MULTI-USER CHANNEL PREDICTION FOR MOBILITY SCENARIOS

(71) Applicant: QUALCOMM Incorporated, San Diego, CA (US)

(72) Inventors: David Yunusov, Holon (IL); Gideon Shlomo Kutz, Ramat Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 18/163,858

(22) Filed: Feb. 2, 2023

(65) Prior Publication Data

US 2024/0267182 A1  Aug. 8, 2024

(51) Int. Cl.
*H04L 5/00* (2006.01)
*H04B 7/0452* (2017.01)
*H04B 7/0456* (2017.01)
*H04W 72/0446* (2023.01)

(52) U.S. Cl.
CPC ......... *H04L 5/0051* (2013.01); *H04B 7/0452* (2013.01); *H04B 7/0456* (2013.01); *H04W 72/0446* (2013.01)

(58) Field of Classification Search
CPC ... H04L 5/0051; H04B 7/0452; H04B 7/0456; H04W 72/0446
See application file for complete search history.

(56) References Cited

U.S. PATENT DOCUMENTS

| | | | | |
|---|---|---|---|---|
| 9,219,533 B2* | 12/2015 | Tseng | | H04L 25/0242 |
| 9,363,002 B2* | 6/2016 | Khayrallah | | H04B 7/0452 |
| 10,263,682 B2* | 4/2019 | Rudrapatna | | H04B 7/0639 |
| 10,868,605 B2* | 12/2020 | Wang | | H04B 7/0626 |
| 11,552,837 B2* | 1/2023 | Sung | | H04L 5/0048 |
| 11,569,961 B2* | 1/2023 | Farmanbar | | H04B 7/0417 |
| 11,683,712 B2* | 6/2023 | Wang | | H04L 5/0053 |
| | | | | 370/252 |
| 11,742,909 B2* | 8/2023 | Hadani | | H04B 7/024 |
| | | | | 375/267 |
| 11,916,634 B2* | 2/2024 | Elshafie | | H04B 17/24 |
| 12,088,369 B2* | 9/2024 | Kwon | | H04W 72/0453 |
| 2018/0159602 A1* | 6/2018 | Tsai | | H04B 7/0626 |
| 2021/0050893 A1* | 2/2021 | Park | | H04B 7/0617 |
| 2023/0284139 A1* | 9/2023 | Ma | | H04B 7/0626 |
| | | | | 370/329 |

* cited by examiner

*Primary Examiner* — Bailor C Hsu

(74) *Attorney, Agent, or Firm* — QUALCOMM Incorporated

(57) ABSTRACT

Methods, systems, and devices for wireless communications are described. A network entity may transmit via a first time slot, a first set of demodulation reference signals (DMRSs) and a second set of DMRSs that may be associated with a set of user equipments (UEs). The network entity may receive from the set of UEs, respective feedback messages indicating respective channel estimation information based on the first set of DMRSs and the second set of DMRSs. The network entity may generate a multi-user multi-input and multi-output (MU-MIMO) channel prediction for a second slot subsequent the first slot, based on the respective feedback messages and generate a MU-MIMO channel precoder associated with the set of UEs based on the MU-MIMO channel prediction. The network entity may transmit, during the second slot, one or more messages to the UEs based on the MU-MIMO channel prediction and the MU-MIMO channel precoder.

30 Claims, 20 Drawing Sheets

DMRS Ports 405

Extended DMRS Ports 410

400

MULTI-USER CHANNEL PREDICTION FOR MOBILITY SCENARIOS

FIELD OF TECHNOLOGY

The following relates to wireless communications, including multi-user channel prediction for mobility scenarios.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multi-user channel prediction for mobility scenarios. For example, the described techniques enable channel estimation on a per slot basis. A network entity and a set of user equipments (UEs) may increase precoding reliability by updating the precoding matrix and precoding channel on a per slot basis. For example, the network entity may transmit one or more demodulated reference signals (DMRSs) for each UE (e.g., a first DMRS using a first set of precoding parameters and an extended DMRS using a second set of precoding parameters orthogonal to the first set of precoding parameters). The network entity may receive per-slot (e.g., slot-specific) channel estimation feedback from one or more of the UEs and generate (e.g., predict) an updated future channel and updated precoding matrix. By receiving feedback for DMRSs on a per slot basis, the network entity may update the channel and precoding matrix faster which may increase precoding reliability (e.g., for higher mobility multi-user multi-input/multi-output (MU-MIMO) communications).

A method for wireless communications is described. The method may include transmitting, via a first time slot, a first DMRS that is precoded according to a first set of precoding parameters for a UE, transmitting, via the first time slot, a second DMRS that is precoded according to a second set of precoding parameters for the UE, receiving a feedback message indicating channel estimation information for the UE based on the first DMRS and the second DMRS, performing, based on the feedback message and one or more other feedback messages for the UE, a channel prediction procedure for a second time slot subsequent to the first time slot, and transmitting, via the second time slot, one or more messages that are precoded according to a third set of precoding parameters, the third set of precoding parameters predicted based on the channel estimation information and the channel prediction procedure.

An apparatus for wireless communications is described. The apparatus may include a processor, memory coupled with the processor, and instructions stored in the memory. The instructions may be executable by the processor to cause the apparatus to transmit, via a first time slot, a first DMRS that is precoded according to a first set of precoding parameters for a UE, transmit, via the first time slot, a second DMRS that is precoded according to a second set of precoding parameters for the UE, receive a feedback message indicating channel estimation information for the UE based on the first DMRS and the second DMRS, perform, based on the feedback message and one or more other feedback messages for the UE, a channel prediction procedure for a second time slot subsequent to the first time slot, and transmit, via the second time slot, one or more messages that are precoded according to a third set of precoding parameters, the third set of precoding parameters predicted based on the channel estimation information and the channel prediction procedure.

Another apparatus for wireless communications is described. The apparatus may include means for transmitting, via a first time slot, a first DMRS that is precoded according to a first set of precoding parameters for a UE, means for transmitting, via the first time slot, a second DMRS that is precoded according to a second set of precoding parameters for the UE, means for receiving a feedback message indicating channel estimation information for the UE based on the first DMRS and the second DMRS, means for performing, based on the feedback message and one or more other feedback messages for the UE, a channel prediction procedure for a second time slot subsequent to the first time slot, and means for transmitting, via the second time slot, one or more messages that are precoded according to a third set of precoding parameters, the third set of precoding parameters predicted based on the channel estimation information and the channel prediction procedure.

A non-transitory computer-readable medium storing code for wireless communications is described. The code may include instructions executable by a processor to transmit, via a first time slot, a first DMRS that is precoded according to a first set of precoding parameters for a UE, transmit, via the first time slot, a second DMRS that is precoded according to a second set of precoding parameters for the UE, receive a feedback message indicating channel estimation information for the UE based on the first DMRS and the second DMRS, perform, based on the feedback message and one or more other feedback messages for the UE, a channel prediction procedure for a second time slot subsequent to the first time slot, and transmit, via the second time slot, one or more messages that are precoded according to a third set of precoding parameters, the third set of precoding parameters predicted based on the channel estimation information and the channel prediction procedure.

In some examples of the method, apparatuses, and non-transitory computer-readable medium described herein, performing the channel prediction procedure may include operations, features, means, or instructions for predicting, for the second time slot, a channel response vector based on a set of channel coefficients indicated by the channel estimation information, the channel response vector associated with one or more antenna ports of a set of antenna ports and generating the third set of precoding parameters based on the channel response vector, the one or more messages precoded in accordance with the third set of precoding parameters.

In some examples of the method, apparatuses, and non-transitory computer-readable medium described herein, predicting the channel response vector may include operations, features, means, or instructions for combining one or more previous channel estimation information associated with the one or more antenna ports of the set of antenna ports, the one or more previous channel estimation information associated with the one or more other feedback messages.

Some examples of the method, apparatuses, and non-transitory computer-readable medium described herein may further include operations, features, means, or instructions for receiving, prior to receiving the feedback message, the one or more other feedback messages, where the feedback message and each feedback message of the one or more other feedback messages may be associated with a respective time slot prior to the first time slot.

In some examples of the method, apparatuses, and non-transitory computer-readable medium described herein, transmitting the one or more messages may include operations, features, means, or instructions for transmitting, via the second time slot, the one or more messages based on receiving the one or more other feedback messages.

Some examples of the method, apparatuses, and non-transitory computer-readable medium described herein may further include operations, features, means, or instructions for transmitting a control message indicating a set of information for processing the first DMRS for decoding at the UE and processing the second DMRS.

In some examples of the method, apparatuses, and non-transitory computer-readable medium described herein, the first set of precoding parameters may be different from the second set of precoding parameters associated with the second DMRS.

Some examples of the method, apparatuses, and non-transitory computer-readable medium described herein may further include operations, features, means, or instructions for transmitting, via the first time slot, a first set of DMRSs precoded according to the first set of precoding parameters, where each DMRS of the first set of DMRSs may be associated with a respective UE of a set of UEs that includes the UE, transmitting, via the first time slot, a second set of DMRSs precoded according to the second set of precoding parameters, where each DMRS of the second set of DMRSs may be associated with a respective UE of the set of UEs, and receiving, from the set of UEs, respective feedback messages indicating respective channel estimation information based on the first set of DMRSs and the second set of DMRSs.

Some examples of the method, apparatuses, and non-transitory computer-readable medium described herein may further include operations, features, means, or instructions for generating a MU-MIMO channel prediction based on the respective feedback messages and generating a MU-MIMO channel precoder associated with the set of UEs based on the MU-MIMO channel prediction.

In some examples of the method, apparatuses, and non-transitory computer-readable medium described herein, the channel estimation information includes a set of coefficients associated with a precoded channel response.

A method for wireless communications is described. The method may include receiving, via a first time slot, a first DMRS that is precoded according to a first set of precoding parameters, receiving, via the first time slot, a second DMRS that is precoded according to a second set of precoding parameters, transmitting a feedback message indicating channel estimation information for the UE based on the first DMRS and the second DMRS, and receiving, via a second time slot subsequent to the first time slot, one or more messages that are precoded according to a third set of precoding parameters, the third set of precoding parameters predicted based on the channel estimation information and a channel prediction procedure of a network entity.

An apparatus for wireless communications is described. The apparatus may include a processor, memory coupled with the processor, and instructions stored in the memory. The instructions may be executable by the processor to cause the apparatus to receive, via a first time slot, a first DMRS that is precoded according to a first set of precoding parameters, receive, via the first time slot, a second DMRS that is precoded according to a second set of precoding parameters, transmit a feedback message indicating channel estimation information for the UE based on the first DMRS and the second DMRS, and receive, via a second time slot subsequent to the first time slot, one or more messages that are precoded according to a third set of precoding parameters, the third set of precoding parameters predicted based on the channel estimation information and a channel prediction procedure of a network entity.

Another apparatus for wireless communications is described. The apparatus may include means for receiving, via a first time slot, a first DMRS that is precoded according to a first set of precoding parameters, means for receiving, via the first time slot, a second DMRS that is precoded according to a second set of precoding parameters, means for transmitting a feedback message indicating channel estimation information for the UE based on the first DMRS and the second DMRS, and means for receiving, via a second time slot subsequent to the first time slot, one or more messages that are precoded according to a third set of precoding parameters, the third set of precoding parameters predicted based on the channel estimation information and a channel prediction procedure of a network entity.

A non-transitory computer-readable medium storing code for wireless communications is described. The code may include instructions executable by a processor to receive, via a first time slot, a first DMRS that is precoded according to a first set of precoding parameters, receive, via the first time slot, a second DMRS that is precoded according to a second set of precoding parameters, transmit a feedback message indicating channel estimation information for the UE based on the first DMRS and the second DMRS, and receive, via a second time slot subsequent to the first time slot, one or more messages that are precoded according to a third set of precoding parameters, the third set of precoding parameters predicted based on the channel estimation information and a channel prediction procedure of a network entity.

Some examples of the method, apparatuses, and non-transitory computer-readable medium described herein may further include operations, features, means, or instructions for receiving, via the first time slot, one or more demodulated reference signals associated with one or more second UEs, where the channel estimation information may be based on the one or more demodulated reference signals associated with the one or more second UEs.

Some examples of the method, apparatuses, and non-transitory computer-readable medium described herein may further include operations, features, means, or instructions for measuring a frequency domain response of a channel associated with receiving the first DMRS and the second DMRS and generating a time domain response based on the frequency domain response of the channel.

Some examples of the method, apparatuses, and non-transitory computer-readable medium described herein may further include operations, features, means, or instructions for generating a spatial model based on the time domain response or the frequency domain response of the channel, where the feedback message includes a two dimensional time and space domain response of the channel based on the time domain response and the spatial model.

In some examples of the method, apparatuses, and non-transitory computer-readable medium described herein, transmitting the feedback message may include operations, features, means, or instructions for transmitting, in the first time slot, the feedback message indicating the channel estimation information including a set of differential channel coefficients associated with a coding parameter, where each differential channel coefficient of the set of differential channel coefficients includes a channel coefficient difference relative to a respective channel coefficient of a set of channel coefficients associated with one or more slots prior to the first time slot.

Some examples of the method, apparatuses, and non-transitory computer-readable medium described herein may further include operations, features, means, or instructions for transmitting the feedback message via a physical uplink control channel (PUCCH) or a physical uplink shared channel (PUSCH).

Some examples of the method, apparatuses, and non-transitory computer-readable medium described herein may further include operations, features, means, or instructions for transmitting the feedback message using a first set of frequency resources and receiving data using a second set of frequency resources different from the first set of frequency resources, where transmitting the feedback message and receiving the data occurs concurrently via a full-duplex mode of the UE.

Some examples of the method, apparatuses, and non-transitory computer-readable medium described herein may further include operations, features, means, or instructions for receiving a control message indicating a set of information for processing the first DMRS and the second DMRS.

In some examples of the method, apparatuses, and non-transitory computer-readable medium described herein, the first set of precoding parameters may be different from the second set of precoding parameters associated with the second DMRS.

In some examples of the method, apparatuses, and non-transitory computer-readable medium described herein, the channel estimation information includes a set of coefficients associated with a precoded channel response.

DETAILED DESCRIPTION

In some examples of wireless communications, one or more devices may operate in accordance with multi-user multi-input/multi-output (MU-MIMO) communications. For example, a network entity may concurrently transmit (e.g., via at least partially overlapping time-frequency resources) multiple data streams to a set of spatially multiplexed user equipments (UEs). In some examples, MU-MIMO communications may be based on updating a precoding matrix at the network entity using information of a channel from each network entity transmission antenna (or antenna port) to each UE reception antenna (or antenna port). The network entity may periodically transmit channel state information reference signals (CSI-RSs) and receive the information of the channel based on feedback from each UE in response to the CSI-RSs. In some examples, the network entity may receive the information of the channel by receiving sounding reference signals (SRSs) from each UE. In some cases, however, the periodicity of transmitting CSI-RS and SRS may occur every several slots. As such, if the set of UEs are operating in a high mobility environment, the precoding matrix may become outdated in between reference signal transmissions, which may degrade spatial separation and orthogonality of data channels between the set of UEs.

As such, the network entity, and the set of UEs may increase precoding reliability by updating the precoding matrix and precoding channel on a per slot basis. For example, in slots that are not scheduled or allocated for a CSI-RS or SRS transmission, the network entity may transmit one or more demodulated reference signals (DMRSs) for each UE (e.g., a first DMRS using a first set of precoding parameters and an extended DMRS using a second set of precoding parameters orthogonal to the first set of precoding parameters). As such, the network entity may receive, per-slot, channel estimation feedback from each UE and predict an updated channel and updated precoding matrix. By receiving feedback for DMRSs on a per slot basis, the network entity may update the channel and precoding matrix faster which may increase precoding reliability for higher mobility MU-MIMO communications.

Aspects of the disclosure are initially described in the context of wireless communications systems. Aspects of the disclosure are further described in the context of a resource mapping scheme, a channel compression procedure, a time domain channel response diagram, differential encoding schemes, and process flows. Aspects of the disclosure are further illustrated by and described with reference to apparatus diagrams, system diagrams, and flowcharts that relate to multi-user channel prediction for mobility scenarios.

Figure 1:
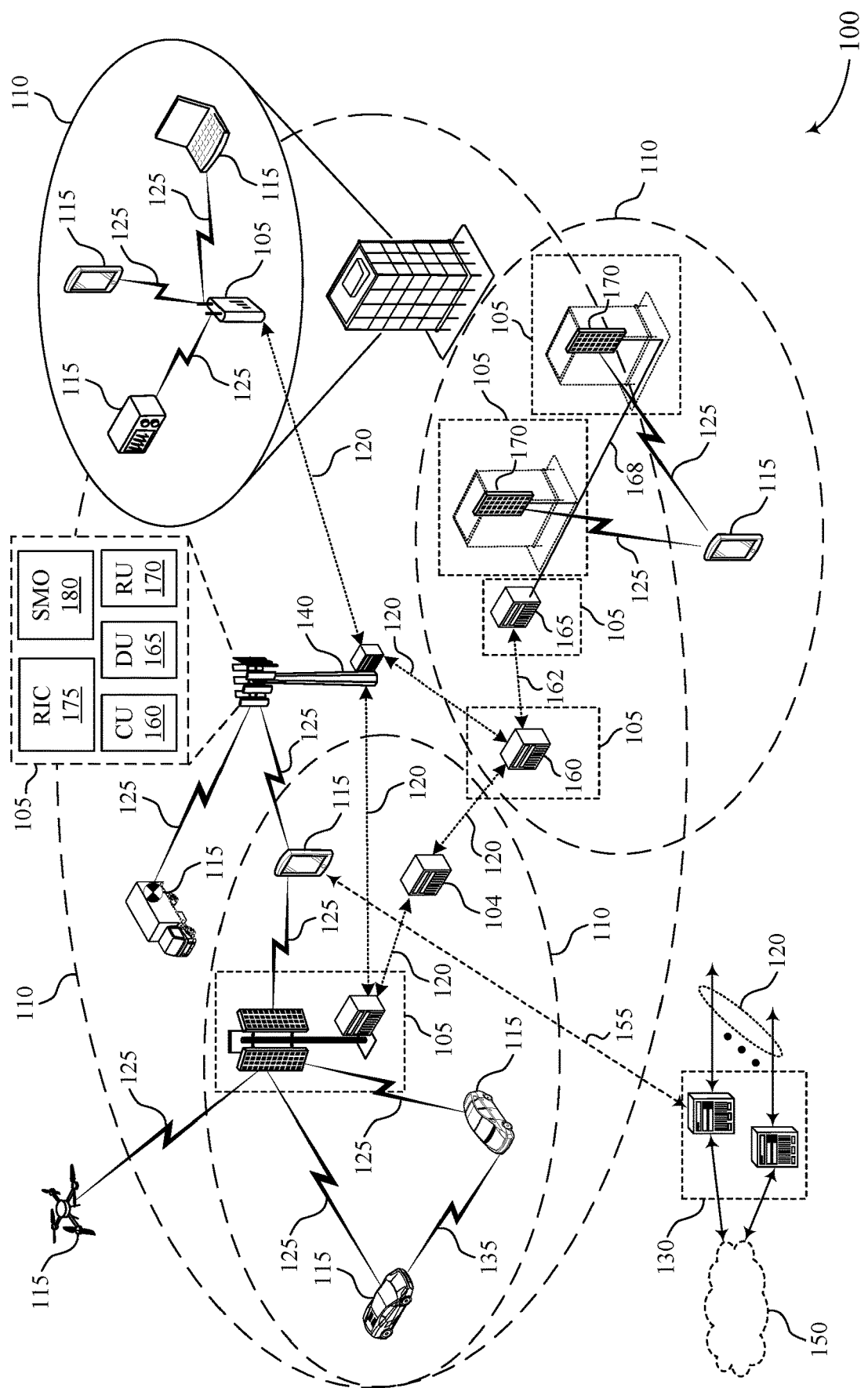
FIG. 1 illustrates an example of a wireless communications system that supports multi-user channel prediction for mobility scenarios in accordance with one or more aspects of the present disclosure.

FIG. 1 illustrates an example of a wireless communications system 100 that supports multi-user channel prediction for mobility scenarios in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multi-user channel prediction for mobility scenarios as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $TS=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and MU-MIMO, for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of wireless communications system 100, a network entity 105 may concurrently transmit multiple data streams to a set of UEs 115 (e.g., spatially multiplexed UEs). In some examples, MU-MIMO communications may be based on updating a precoding matrix at the network entity 105 using information of a channel from each network entity 105 transmission antenna (or antenna port) to each UE 115 reception antenna (or antenna port). The network entity 105 may receive the information for the channel based on periodically transmitting CSI-RSs and receiving feedback from each UE 115 or based on receiving SRSs from each UE. In some cases, however, the periodicity of transmitting CSI-RS and SRS may occur every several slots. As such, if the set of UEs 115 are operating in a high mobility environment, the precoding matrix may become outdated or insufficient for communications in between reference signal transmissions, which may degrade spatial separation and orthogonality of data channels between the set of UEs 115.

As such, the network entity 105 and the set of UEs 115 may increase precoding reliability by updating the precoding matrix and precoding channel on a per slot basis. For example, in slots not including a CSI-RS or SRS transmission, the network entity 105 may transmit one or more DMRSs for each UE 115 (e.g., a first DMRS using a first set of precoding parameters and an extended DMRS using a second set of precoding parameters orthogonal to the first set of precoding parameters). As such, the network entity 105 may receive, per-slot, channel estimation feedback from each UE 115 and predict an updated channel and updated precoding matrix. By receiving feedback for DMRSs on a per slot basis, the network entity 105 may predict a future slot channel, and use the future slot channel to calculate a precoding matrix which may increase precoding reliability for higher mobility MU-MIMO communications.

Figure 2:
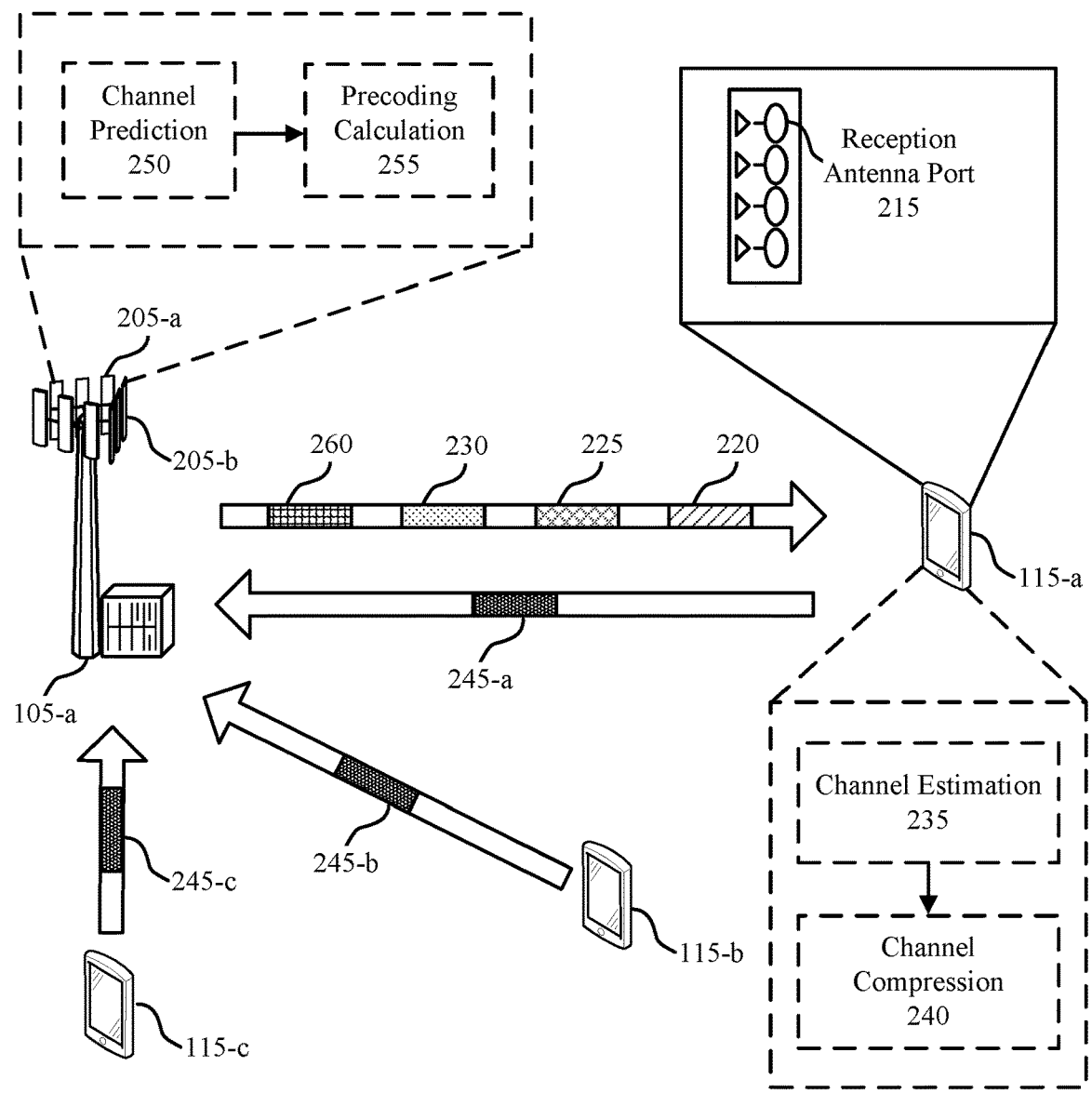
FIG. 2 illustrates an example of a wireless communications system that supports multi-user channel prediction for mobility scenarios in accordance with one or more aspects of the present disclosure.

FIG. 2 illustrates an example of a wireless communications system 200 that supports multi-user channel prediction for mobility scenarios in accordance with one or more aspects of the present disclosure. In some examples, the wireless communications system 200 may implement aspects of a wireless communications system 100. For example, the wireless communications system 200 may include a network entity 105-a and UEs 115-a, 115-b, and 115-c, which may be examples of a network entity 105 and UEs 115, as described with reference to FIG. 1.

In some examples of wireless communications system 100, one or more devices may operate in accordance with MU-MIMO communications. For example, the network entity 105-a may concurrently transmit multiple data streams to the UEs 115, where the UEs 115 may be spatially multiplexed. In some examples, MU-MIMO communications may be based on updating a precoding matrix at the network entity 105-a using information of a channel from each network entity 105-a transmission antenna port 205 (e.g., transmission antenna port 205-a and 205-b) to each UE 115 reception antenna port 215. The network entity 105-a may receive the information for the channel based on periodically communicating CSI-RSs, SRSs, or both and receive feedback from each UE 115. In some examples of channel reciprocity, the network entity 105-a may receive an SRS from various UE 115 antennas for each UE 115 and measure the associated uplink channels.

In some cases, however, the periodicity of transmitting CSI-RS and SRS may occur every several slots. As such, if the set of UEs 115 are operating in a high mobility environment, the precoding matrix at the network entity 105-a may become insufficient or outdated in between reference signal transmissions, which may degrade spatial separation and orthogonality of data channels between the set of UEs 115. Additionally, or alternatively, SRS transmission may have a lack reciprocity in some communication modes (e.g., FDD mode) and may have a limited link budget (e.g., associated with a lower signal to noise ratio (SNR)). In some cases, a limited link budget may increase a time associated with switching between uplink transmissions and downlink transmission, which may increase latency of the system.

According to the techniques described herein, the network entity 105-a and the UEs 115 may increase precoding reliability by updating a precoding matrix, a precoding channel, or both on a per slot basis. For example, in slots that are not associated with (e.g., do not include, are not scheduled for) a CSI-RS or SRS transmission, the network entity 105-a may transmit one or more DMRSs 220 for each UE 115. For example, each UE 115 may receive a DMRS 220, which may be used by each respective UE 115 to decode downlink data transmissions (e.g., physical downlink shared channel (PDSCH) transmissions) from the network entity 105-a and as such, may be received by the UEs 115 in downlink slots that contain or are scheduled for data. In some examples, the network entity 105-a may precode the DMRS 220 before transmitting the DMRS 220 to the UE 115-a. Precoding may refer to the process of mapping layered data to antenna ports for transmission via a device such as network entity 105-a or UE 115-a. In some cases, precoding may involve multiplying a multi-bit signal with a precoding matrix such that each reception antenna port 215 at a UE 115-a may obtain, upon reception, one or more data layers with a given weighting. If the quantity of transmit antenna ports 205 at the network entity 105-a is larger than a quantity of layers used to transmit the DMRS 220, the DMRS 220 may be precoded using non-square precoding (e.g., a quantity of rows of the precoding matrix is not equal to a quantity of columns of the precoding matrix).

As described herein, the DMRS 220 may be precoded using non-square precoding resulting in channel estimation per layer and not per antenna port. To increase or improve an associated precoding subspace, the network entity 105-a may additionally transmit an extended DMRS 225. The extended DMRS 225 may be referred to as a pilot signal. The precoding matrix used to precode the extended DMRS 225 may be different from the precoding matrix used to precode the DMRS 220, but in some examples, may be associated with a precoding matrix used to precode the DMRS 220. For example, the precoding matrix used to precode the extended DMRS 225 may be orthogonal to the precoding used to precode the DMRS 220. In some examples, the network entity 105-a may transmit a control message 230 that may indicate a set of information for processing the DMRS 220 for decoding and processing the extended DMRS 225 Further discussion of DMRS 220 and extended DMRS 225 are described here, including with reference to FIG. 4.

If a UE 115-a supports the use of the extended DMRS 225, the UE 115 may receive the extended DMRS 225 and the DMRS 220 from the network entity 105-a and estimate the downlink channel (e.g., a downlink channel matrix) based on the DMRS 220 and the extended DMRS 225. For example, the UE 115-a may perform channel estimation 235 of the downlink channel associated using the DMRS 220 and the extended DMRS 225. Further discussion of channel estimation is described herein, including with reference to FIG. 3.

Upon performing channel estimation 235, the UE 115-a may perform channel compression 240. In some examples, the channel compression may exploit the sparse nature (e.g., sparsity) of the communication channel in the spatial domain and the time domain. For example, in the spatial domain, the correlation between antenna ports at the network entity 105-a or the correlation between antenna ports at UE 115-a may enable accurate representation of the channel while using one or more eigenvectors (e.g., few eigenvectors compared to the quantity of antenna ports) of the autocorrelation matrix. Further discussion of channel compression 240 is described herein, including with reference to FIGS. 5 through 7.

Based on performing the channel estimation 235 and channel compression 240, each UE may transmit a respective feedback message 245. For example, UE 115-a may transmit feedback message 245-a, UE 115-b may transmit feedback message 245-b, and UE 115-c may transmit feedback message 245-c. As such, the network entity 105-a may receive the respective feedback messages 245 from each of the UEs 115 and perform channel prediction 250. For example, the network entity 105-a may generate an MU-MIMO channel prediction based on the respective feedback messages 245. In some examples, the network entity 105-a may generate the MU-MIMO channel prediction using additional messages from the respective UEs (e.g., feedback messages 245 including channel estimation 235 for previous slots). After generating the channel prediction 250, the network entity 105-a may perform a precoding calculation 255 (e.g., generate a set of precoding parameters associated with the predicted channel). For example, the network entity 105-a may use the generated MU-MIMO channel prediction to generate a MU-MIMO channel precoder associated with the set of UEs 115. Further discission of channel prediction 250 and precoding calculation 255 are described herein, including with reference to FIG. 3.

As such, the network entity 105-a may use the MU-MIMO channel precoder and the predicted MU-MIMO channel to transmit one or more messages during a slot subsequent to transmission of the DMRS 220 and extended DMRS 225. For example, the network entity 105-a may precode one or more messages using the MU-MIMO channel precoder and transmit the messages on predicted channel 260. In some examples, the one or more messages may be DMRS 220 and extended DMRS that the UEs 115 may use to perform channel estimation 235 for the subsequent slot. In some examples, the one or more messages may be CSI-RSs used by the UEs 115 to perform channel estimation 235. By receiving channel estimation 235 on a per slot basis, the network entity 105-a may update the channel and precoding matrix faster which may increase precoding reliability for higher mobility MU-MIMO communications.

Figure 3:
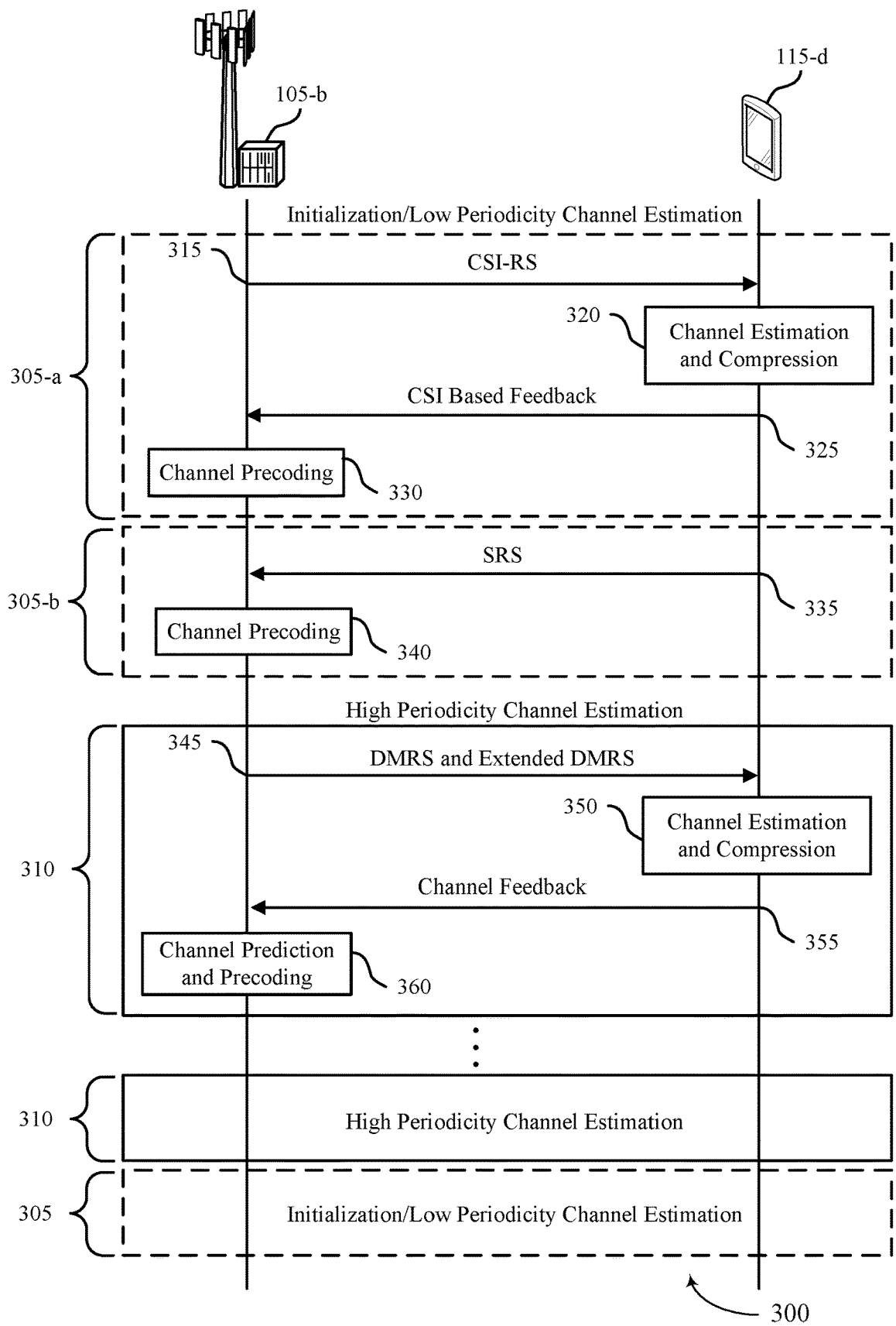
FIG. 3 illustrates an example of a process flow that supports multi-user channel prediction for mobility scenarios in accordance with one or more aspects of the present disclosure.

FIG. 3 illustrates an example of a process flow 300 that supports multi-user channel prediction for mobility scenarios in accordance with one or more aspects of the present disclosure. In some examples, process flow 300 may implement aspects of wireless communications system 100 and wireless communications system 200. Process flow 300 includes a UE 115-d and a network entity 105-b which may be respective examples of a UE 115 and a network entity 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 300 shows processes between a single UE 115 and a single network entity 105, it should be understood that these processes may occur between any quantity of network devices and network device types. For example, the process flow 300 may be adapted in which the network entity 105-b communicates with a set of UEs 115 via MU-MIMO communication techniques described herein.

At 305, the network entity 105-b and UE 115-d may communicate one or more signals in accordance with an initialization or low periodicity channel estimation procedure. In some examples, the initialization or low periodicity channel estimation procedure of 305 may occur every several time slots. In some examples, the UE 115-d and network entity 105-b may perform a CSI-RS based channel estimation (e.g., 305-a) or an SRS based channel estimation (e.g., 305-b).

In examples of 305-a, at 315, the network entity 105-b may transmit a CSI-RS to the UE 115-d. In some examples, the network entity 105-b may transmit the CSI-RS with repetitions in the time domain. For example, network entity 105-b may use a same CSI-RS location (e.g., time location) across multiple resource blocks with several repetitions in time within the time slot. To control the overhead of the CSI-RS, the network entity 105-b may apply a decimation to the periodic CSI-RS in the frequency domain. Additionally or alternatively, the network entity 105-b may alternate the time domain position of the CSI-RS repetitions across the frequency bandwidth of a time slot. For example, the network entity 105-b may alternate the time domain position of the CSI-RS between consecutive resource blocks within the same time slot.

At 320, the UE 115-d may perform channel estimation and compression using the received CSI-RS. Based on the network entity 105-b transmitting several repetitions of the CSI-RS with varying timing offsets, the UE 115-d may sample a same antenna port multiple times, which may allow the UE 115-d to increase the quality of channel extrapolation for future time slots and may enable a higher prediction of CSI based information (e.g., modulation and coding scheme (MCS), rank, SNR), and precoding allocation positioning).

At 325, the UE 115-d may transmit a CSI based feedback which may include the channel estimation information generated at 320.

At 330, the network entity 105-b may perform channel precoding based on the channel estimation information included in the CSI based feedback.

In examples of 305-b, at 335, the UE 115-d may transmit an SRS to the network entity 105-b.

At 340, the network entity 105-b may estimate the reciprocal channel response based on the SRS and use the reciprocal channel response to perform channel precoding.

For time slots that are not configured for the low periodicity channel estimation procedure of 305, the network entity 105-b and the UE 115-d may operate in accordance with high periodicity channel estimation of 310 (e.g., with time slot or sub-time slot granularity). For example, at 345, the network entity 105-b may transmit, via a first time slot, a DMRS that may be precoded using a first set of precoding parameters for the UE 115-d and transmit an extended DMRS that may be precoded using a second set of precoding parameters. In some examples, the first and second set of precoding parameters may be associated, such that the first set of precoding parameters may be orthogonal to the second set of precoding parameters. In examples of MU-MIMO communications, the network entity 105-*b* may transmit a set of DMRSs and a set of extended DMRSs that are associated with a set of UEs 115. Further discussion of the DMRS and extended DMRS are described herein, including with reference to FIG. 4.

At 350, the UE 115-*d* may perform channel estimation and channel compression. For example, the UE 115-*d* may perform channel estimation of the precoded channel using the DMRS and extended DMRS ports received at 345. In examples of MU-MIMO communications, the UE 115-*d* may additionally perform the channel estimation using DMRS ports associated with data streams for other UEs 115. In some examples, the UE 115-*d* may perform the channel estimation using tracking of a power delay profile of the precoded channel over multiple time slots. That is, the UE 115-*d* may use channel estimation of the precoded channel from previous time slots to generate the channel estimation at 350. Based on performing channel estimation, the UE 115-*d* may perform channel compression. Further discussion of channel compression performed by the UE 115-*d* is described herein, including with reference to FIGS. 5 through 7.

At 355, the UE 115-*d* may transmit a channel feedback message indicating the channel estimation of the compressed channel generated at 350. In some examples, the channel estimation may include a set of channel coefficients generated by the UE 115-*d*. In some examples, the UE 115-*d* may transmit the channel feedback message via an uplink channel (e.g., via a physical uplink control channel (PUCCH) or a physical uplink shared channel (PUSCH)). As such, the feedback message may be included in uplink control information (UCI) or a medium access control-control element (MAC-CE) message.

Additionally or alternatively, the UE 115-*d* may transmit the channel feedback message using a full-duplex mechanism. For example, the UE 115-*d* may transmit the feedback message of the compressed channel concurrently with reception of data (e.g., separated in frequency domain). In such examples, the UE 115-*d* may transmit the feedback message over a one or more resource blocks located in the middle of a downlink allocated frequency bandwidth. In some examples, the resource blocks allocated to transmitting the feedback message may include one or more frequency guard carriers to prevent overlap with the downlink frequency bands on either side. In some examples, using a full-duplex mode to transmit the channel feedback message may reduce the latency associated with using uplink channels and reduce overhead associated with switching between uplink transmissions and downlink reception.

In examples of MU-MIMO communications, the network entity 105-*b* may receive respective channel feedback messages from multiple UEs 115.

At 360, the network entity 105-*b* may perform a channel prediction procedure based on the channel feedback message received at 355 and one or more other channel feedback messages associated with previous time slots.

In a first example, the network entity 105-*b* may perform a channel prediction process on a single tap (e.g., flat fading) channel. While such a channel prediction process may be associated with a single reception antenna at the UE 115-*d*, an extension of the channel prediction of multi-path and frequency division multiplexing (e.g., for the case of multiple reception antennas), as described herein. The network entity 105-*b* may perform channel prediction to predict a channel response vector from each antenna of the network entity 105-*b* to a single reception antenna of the UE 115-*d* for the subsequent time slot. In some examples, the channel prediction may be repeated for each UE 115 associated with the network entity 105-*b* and for each reception antenna of each UE 115.

In some cases, the network entity 105-*b* may receive a precoded channel from each UE 115. Based on the network entity 105-*b* being aware of the precoding used for the DMRS and extended DMRS, the network entity 105-*b* may generate the associated linear coefficients using the channel estimation information (e.g., received in the channel feedback at 355). In cases of multiple precoding vectors, the network entity 105-*b* may generate multiple linear combinations of the channel vector.

Additionally, the network entity 105-*b* may aggregate the channel estimation information received for multiple past time slots to generate additional linear combinations of channel vectors associated with the past time slots. The additional channel vectors may be associated with past channels used at the network entity 105-*b* and may be correlated with the current channel used to transmit the DMRS and extended DMRS, at 345. As such, the additional channel vectors and the current channel vector may be used to predict the channel for the subsequent time slot. For example, by using the current channel vector and the additional channel vectors, the network entity 105-*b* may solve the following linear prediction equation:

$$\arg_G \min E \left\{ \left\| G \begin{bmatrix} w_{0,t-l} h_{t-l} \\ \vdots \\ w_{N-1,t-l} h_{t-l} \\ w_{0,t-l+1} h_{t-l+1} \\ \vdots \\ w_{N-1,t} h_t \end{bmatrix} - h_{t+1} \right\|^2 \right\} \quad (1)$$

where, G may represent the prediction matrix, row vector $w_{n,t-1}$ may represent the n-th precoding vector, N may represent a total quantity of such vectors per time slot for the time slot time t–1 (e.g., time slot number), t may represent the current time slot, t+1 may represent the subsequent time slot the network may predict, and column vector $h_{t-l}$ may represent the channel vector at time slot t–1. The network entity 105-*b* may solve for the prediction matrix G by identifying the correlations of the following equation:

$$E\left[w_{n_1,t_1} h_{t1} h_{t2}^H w_{n2,t2}^H\right] = w_{n_1,t_1} R_{hh}(t_1 - t_2) w_{n2,t2}^H \quad (2)$$

where, $R_{hh}(t_1-t_2)$ may represent a matrix that includes elements i, j. The i, j elements of matrix $R_{hh}(t_1-t_2)$ may be solved in accordance with the following equation:

$$[R_{hh}(t_1 - t_2)]_{i,j} = J_0(2\pi f_d T(t_1 - t_2)) R_c(i, j) \quad (3)$$

where, a temporal correlation of each matrix element may be based on the time difference $T(t_1-t_2)$, and $R_c(i, j)$ where may represent the correlation between antenna i and antenna j. While the equation uses a Bessel function to calculate the elements of matrix $R_{hh}(t_1-t_2)$, it is understood that other functions may be used to estimate the elements of matrix $R_{hh}(t_1-t_2)$.

In accordance with the equations described herein, the network entity 105-*b* may predict the channel response vector per UE 115, for a desired timing ($t_d$) (e.g., the subsequent time slot). The network entity may predict the channel response vectors using the multiple channel feedback messages sent from a given UE 115. While the following equations provide an example of predicting a channel for the subsequent time slot ($t_d$) using two reception antennas, it is understood the equations may be adapted to predict the channel using any quantity reception antennas. For example, network entity 105-*b* may represent the channel feedback for the UE 115-*d* for a given previous time slot ($t_i$) in accordance with the following equation:

$$y_{t_i} = \begin{bmatrix} P^0_{t_i} & P^1_{t_i} \end{bmatrix} \begin{bmatrix} H^0_{t_i} \\ H^1_{t_i} \end{bmatrix} + n = \begin{bmatrix} P^0_{t_i} & P^1_{t_i} \end{bmatrix} \cdot \begin{bmatrix} F_c & \\ & F_c \end{bmatrix} \begin{bmatrix} h^0_{t_i} \\ h^1_{t_i} \end{bmatrix} + n \quad (4)$$

where, $P_{t_i}^j$ may represent a diagonal matrix with precoding values for reception antenna j, $H_{t_i}^j$ may represent a channel response vector per subcarrier for antenna j, $F_c$ may represent a Fast Fourier Transform (FFT) matrix cut to rows and columns according to occupied subcarriers and time domain support of the channel (e.g., for M taps), and $h_{t_i}^j$ may represent the time domain channel response for antenna j. As such, the aggregation of N feedbacks associated with N timings (e.g., N previous time slots) may be represented by the following equation:

$$\begin{bmatrix} y_{t_0} \\ y_{t_1} \\ \vdots \\ y_{t_{N-1}} \end{bmatrix} = \begin{bmatrix} P^0_{t_0} & & & P^1_{t_0} & & \\ & P^0_{t_1} & & & P^1_{t_1} & \\ & & \ddots & & & \ddots \\ & & & P^0_{t_{N-1}} & & & P^1_{t_{N-1}} \end{bmatrix} \cdot \quad (5)$$

$$\begin{bmatrix} F_c & & & & & \\ & F_c & & & & \\ & & F_c & & & \\ & & & \ddots & & \\ & & & & \ddots & \\ & & & & & F_c \end{bmatrix} \begin{bmatrix} h^0_{t_0} \\ \vdots \\ h^0_{t_{N-1}} \\ h^1_{t_0} \\ \vdots \\ h^1_{t_{N-1}} \end{bmatrix} + n = P \cdot Q \cdot h_o + n$$

As such, the linear minimum mean square error (LMMSE) estimation of the predicted channel for the subsequent time slot ($t_d$) may be represented by of the following equation:

$$\begin{bmatrix} h^0_{t_d} \\ h^1_{t_d} \end{bmatrix} = R_{h_d,h_o} \cdot R^{-1}_{h_o,h_o} \cdot \left( Q^H \cdot P^H \cdot R^{-1}_{n,n} \cdot P \cdot Q + R^{-1}_{h_o,h_o} \right)^{-1} Q^H \cdot P^H \cdot R^{-1}_{n,n} \cdot y \quad (6)$$

where, $R_{n,n}$ may represent a noise covariance matrix, $R_{h_o,h_o}$ may represent a channel autocorrelation matrix, and $R_{h_d,h_o}$ may represent a channel cross-correlation matrix. Assuming each tap of the predicted channel is associated with an independent process at a doppler spread frequency $f_d$, the channel autocorrelation matrix $R_{h_o,h_o}$ may be represented by the following equation:

$$R_{h_o,h_o} = \quad (7)$$

$$kron\left( I_{M\times M}, \begin{bmatrix} J_0(2\pi f_d(t_0 - t_0)) & J_0(2\pi f_d(t_0 - t_1)) & & \\ & \ddots & & \ddots \\ & & & J_0(2\pi f_d(t_{N-1} - t_{N-1})) \end{bmatrix} \right)$$

Additionally, the channel cross-correlation matrix $R_{h_d,h_o}$ may be represented by the following equation:

$$R_{h_d,h_o} = kron\left( I_{M\times M}, \begin{bmatrix} J_0(2\pi f_d(t_0 - t_d)) \\ \vdots \\ J_0(2\pi f_d(t_{N-1} - t_d)) \end{bmatrix} \right) \quad (8)$$

where, $J_0(x)$ may represent a Bessel function of 0.

Based on generating the MU-MIMO predicted channel for the subsequent time slot in accordance with the channel prediction procedure, the network entity 105-*b* may generate a precoding matrix associated with the predicted channel. For example, using the MU-MIMO predicted channel for all associated UEs 115 for the subsequent time slot, the network entity 105-*b* may generate a MU-MIMO channel precoder. The MU-MIMO channel precoder may increase the capacity of each of the UEs 115 while decreasing interference between the UEs 115. In some examples, the network entity 105-*b* may generate the MU-MIMO channel precoder in accordance with a linear discriminate calculation. The linear discriminant calculation may increase the ratio between the reception energy of a given UE 115 and the decrease interferences the given UE 115 may impose on the other UEs 115. In some examples, the network entity 105-*b* may generate the MU-MIMO channel precoder in accordance with a regularized zero forcing calculation. The regularized zero forcing calculation may increase the spectral efficiency for receiving transmissions at a given UE 115 in accordance with the power transmission level used by the network entity 105-*b*. In some examples, the network entity 105-*b* may generate the MU-MIMO channel precoder in accordance with a maximum-minimum signal to interference and noise ratio (SINR) calculation. The maximum-minimum SINR calculation may increase the SINR of a given UE 115 when receiving a transmission from the network entity 105-*b*.

As such, the network entity 105-*b* may transmit, in the subsequent time slot, one or more messages to the UEs 115 in accordance with the predicted MU-MIMO channel and the MU-MIMO channel precoder. For example, the network entity 105-*b* and UEs 115 may operate in accordance with a second high periodicity channel estimation of 310 for the subsequent time slot. In some cases, the network entity 105-*b* and the UEs 115 may continue to perform one or more additional high periodicity channel estimations of 310 for subsequent time slots that may not be configured for the low periodicity channel estimation of 305. For time slots that are configured for the low periodicity channel estimation of 305, the network entity 105-*b* and the UEs 115 may operate in accordance with the techniques of 305-*a* or 305-*b*.

Figure 4:
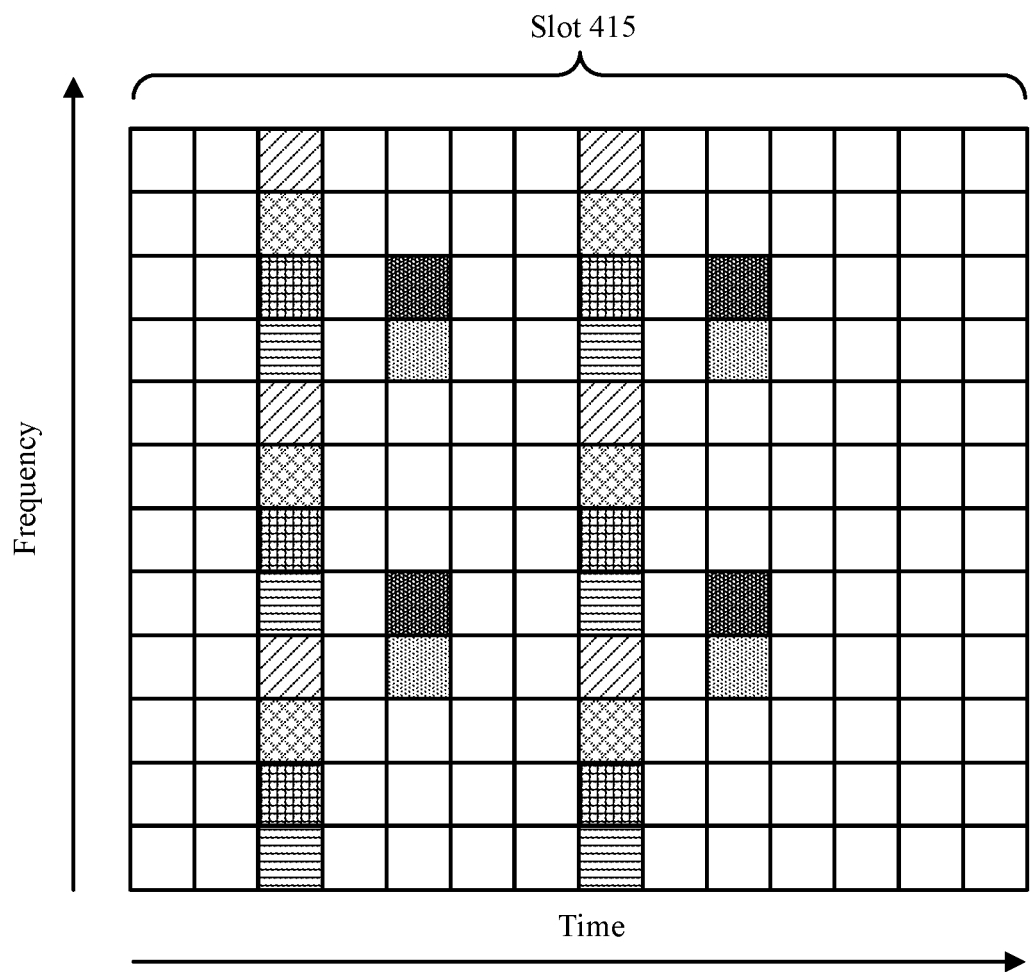
FIG. 4 illustrates an example of a resource mapping scheme that supports multi-user channel prediction for mobility scenarios in accordance with one or more aspects of the present disclosure.
Figure 4:
Figure 4:

FIG. 4 illustrates an example of a resource mapping scheme 400 that supports multi-user channel prediction for mobility scenarios in accordance with one or more aspects of the present disclosure. In some examples, the resource mapping scheme 400 may include aspects of the wireless communications systems 100 and 200, described with respect to FIGS. 1 and 2. For example, the resource mapping scheme 400 may be implemented by a network entity 105, which may be an example of the corresponding device described with reference to FIGS. 1 and 2.

As shown in FIG. 4, the resource mapping scheme 400 may include a slot 415. The slot 415 may be an example of a downlink slot and may include a set of resources that a set of UEs and a network entity may utilize to receive or transmit downlink signals. The set of resources of slot 415 may be divided into multiple subsets of resources, where each subset corresponds to a type of transmission (e.g., allocated for transmission or reception of a type of signal). For example, the slot 415 may include a DMRS region, where the network entity may associate DMRS ports 405 with a set of resources of the slot 415. The DMRS ports 405 may include a set of activated antenna elements that the network entity may use to transmit a set of DMRSs to the set of UEs.

Additionally or alternatively, the slot 415 may include an extended DMRS region, where the network entity may associate extended DMRS ports 410 with a set of resources of the slot 415. The extended DMRS ports 410 may include a set of activated antenna elements that the network entity may use to transmit a set of extended DMRSs to the set of UEs. In some examples, an extended DMRS may be a pilot signal that may be precoded with a second set of precoding parameters different than the first set of precoding parameters used to precode a DMRS. For instance, the network entity may precode the DMRS with orthogonal precoding to the precoder of the extended DMRS. In some examples, the resources allocated to extended DMRS ports 410 may be allocated from DMRS resources or may be allocated from PDSCH resources. Although FIG. 4 shows two types of regions, it understood that more regions may exist in slot 415. For example, the slot 415 may additionally include one or more of a physical downlink control channel (PDCCH) region, a PDSCH region, or a CSI-RS region.

In some examples, the network entity may transmit control signaling to the UEs indicating a set of information for processing the DMRSs and processing the extended DMRS. In some examples, a given UE may process each of the DMRSs and extended DMRSs received (e.g., even for DMRS ports 405 and extended DMRS ports 410 associated with the other UEs).

Figure 5:
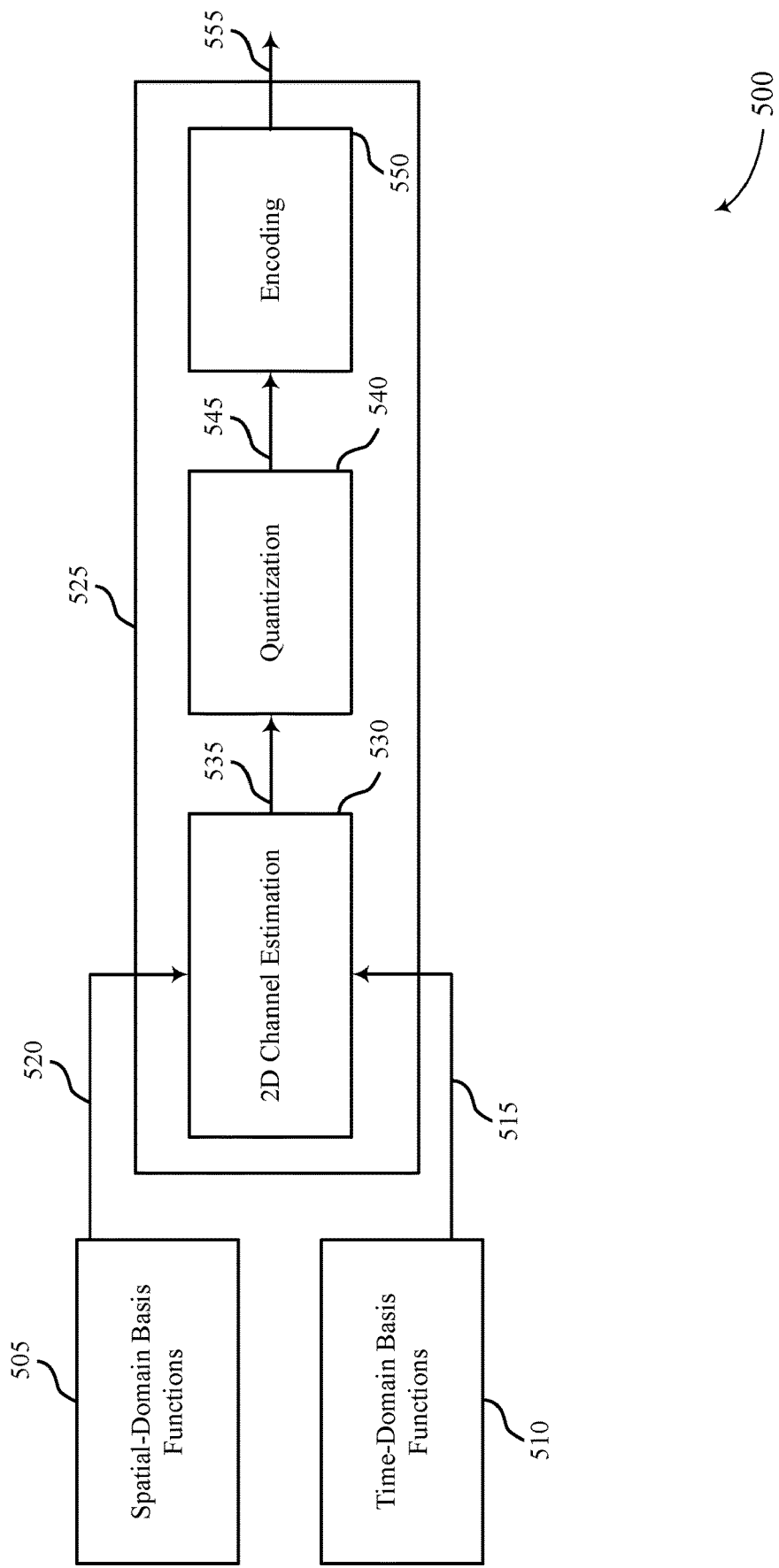
FIG. 5 illustrates an example of a channel compression procedure that supports multi-user channel prediction for mobility scenarios in accordance with one or more aspects of the present disclosure.

FIG. 5 illustrates an example of a channel compression procedure 500 that supports multi-user channel prediction for mobility scenarios in accordance with one or more aspects of the present disclosure. In some examples, the channel compression procedure 500 may include aspects of the wireless communications systems 100 and 200, and process flow 300 described with respect to FIGS. 1 through 3. For example, the channel compression procedure 500 may be implemented by one or more UEs 115 which may be an example of the correspond device described with reference to FIGS. 1 through 3.

In some examples, a compact representation of the channel response may exploit the sparse nature (e.g., sparsity) of the communication channel in the spatial domain and the time domain. For example, in the spatial domain, the correlation between antenna ports at the transmitting device (e.g., the network entity) or the correlation between antenna ports at the receiving device (e.g., the UE) may enable accurate representation of the channel while using one or more eigenvectors (e.g., few eigenvectors compared to the quantity of antenna ports) of the autocorrelation matrix. In some examples, the spatial domain basis functions may be eigenvectors of the autocorrelation matrix. In other words, antennas at the network entity and UE may be correlated such that a channel experienced by a first antenna may be correlated with the channel experienced by a second antenna located near the first antenna. As such, antennas which are co-located, may be correlated and the correlation of such antennas may be exploited for channel compression. Additionally or alternatively, a channel between one transmitting antenna (e.g., an antenna at the network entity) and a receiving antenna (e.g., an antenna at the UE) may also be sparse in the time domain. In some examples, the sparsity of the channel in the time domain (e.g., the sparsity of time domain taps) may enable accurate representation of the channel response using one or more time domain taps (e.g., time delays). In some examples, the time-delays may be used as time domain basis functions for the time-frequency model (e.g., the time domain response of the channel).

For example, as illustrated by FIG. 5, spatial domain basis functions 505 and time domain basis functions 510 may be combined (e.g., at 520 and 515 respectively) to generate a 2D (e.g., time and space) model representative of the channel response (e.g., the compact representation of the channel response). In some examples, the 2D model may be used in channel compression 525, which may include 2D channel estimation 530, quantization 540, and encoding 550. For example, the 2D channel estimation 530 may be used to obtain a set of channel coefficients corresponding to the 2D model. Additionally or alternatively, quantization 540 and encoding 550 (e.g., differential encoding and Huffman coding) of the channel coefficients may enable further compression of the information reported to the network entity (e.g., the feedback message 245). For example, the channel coefficients may be further compressed using quantization 540 and encoding 550 (e.g., at 535 and 545, respectively) and transmitted to a network entity at 555.

Figure 6:
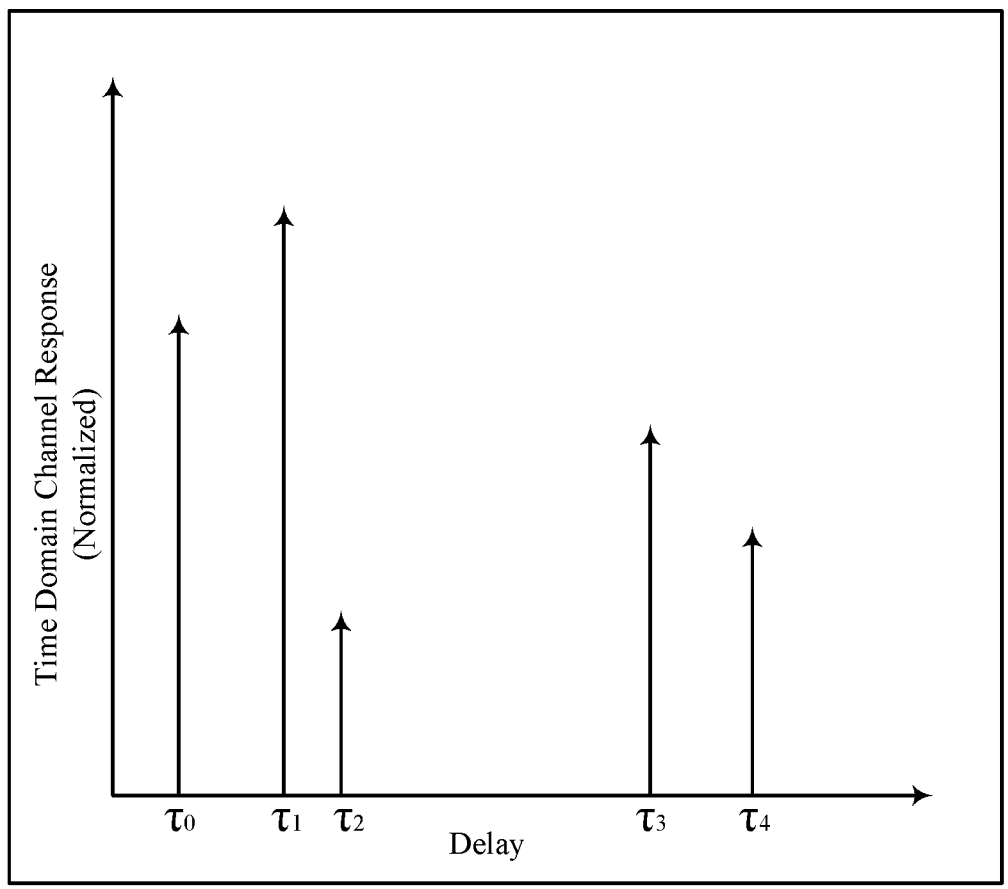
FIG. 6 illustrates an example of a time domain channel response diagram that supports multi-user channel prediction for mobility scenarios in accordance with one or more aspects of the present disclosure.

FIG. 6 illustrates an example of a time domain channel response diagram 600 that supports multi-user channel prediction for mobility scenarios in accordance with one or more aspects of the present disclosure. In some examples, the time domain channel response diagram 600 may implement or be implemented by aspects of wireless communications systems 100 and 200. For example, the time domain channel response diagram 600 may be associated with communications between a network entity and a UE, which may be examples of corresponding devices described with reference to FIGS. 1 and 2.

In some examples, the set of channel coefficients may be generated using a 2D (e.g., time-space) model including a spatial model and a time domain response of a channel. For example, the spatial model may be generated from spatial domain basis functions and the time domain response of the channel may be generated based on time domain basis functions. In some examples, the spatial domain basis functions and the time domain basis functions may be examples of the corresponding basis functions described with reference to FIG. 5. For example, the spatial domain basis functions may reflect a correlation between antenna ports at a transmitting device (e.g., the network entity) or between antenna port pairs at a receiving device (e.g., the UE) and the time domain basis functions may reflect time domain positions of the channel response.

In some examples, the time domain response of the channel (e.g., the time-frequency model) may be represented by a time domain transform of the frequency domain response of the channel. In other words, the time domain response of the channel may be evaluated from the frequency response of the channel. For example, the time domain response of the channel may correspond to the Fourier transform of the measured frequency domain response of the channel for each antenna port at the UE. That is, the frequency domain response of the channel may be measured and converted via a Fourier transform into the (e.g., sparse) time domain response. For example, the time domain response of the channel may be represented by the following equation:

$$\begin{bmatrix} h_0^{FD} \\ h_1^{FD} \\ \vdots \\ h_{Np-1}^{FD} \end{bmatrix} = \begin{bmatrix} F_c & 0 & 0 & 0 \\ 0 & F_c & 0 & 0 \\ 0 & 0 & \ddots & 0 \\ 0 & 0 & 0 & F_c \end{bmatrix} \cdot \begin{bmatrix} h_0^{TD} \\ h_1^{TD} \\ \vdots \\ h_{Np-1}^{TD} \end{bmatrix} + n \quad (9)$$

where, $h_i^{FD}$ may represent the frequency domain response (e.g., where $h_i^{FD}$ is a vector including a quantity (N) of frequency domain coefficients) of the channel measured at the (ith) antenna port (e.g., where i ranges from 0 to Np−1), $h_i^{TD}$ may represent the time domain response (e.g., where $h_i^{TD}$ is a vector including a quantity (M) of time domain coefficients) of the channel (e.g., the Fourier transform of the frequency-domain response), and n may represent noise. Further, each matrix Fe may represent a set of time domain (e.g., impulse response domain) basis functions (e.g., where Fe is a matrix with a quantity (N) of rows and a quantity (M) of columns) that, in some cases, may be a sparse Fourier matrix cut to a selected quantity (N) of time domain basis function rows, each with a quantity (M) of coefficients.

In some examples, the time domain basis functions (e.g., Fe) may be determined based on the energy of the time domain response of the channel at different time positions (e.g., delays). For example, the UE may select a quantity (M) of time delays (e.g., time domain basis functions) in which the energy of the time domain response is relatively high, for example compared to the time domain response at other time delays. In some cases, the UE may determine (e.g., find) the time domain response of the communication channel at multiple transmit antenna ports (e.g., each antenna port used for uplink communications to the network entity) and at multiple receive antenna ports (e.g., each antenna port used for downlink communications from the network entity) and accumulate the energy (e.g., over each of the transmit and receive antenna ports) for a quantity of time delays (e.g., M time delays). For example, as illustrated in the example of FIG. 6, the time domain channel response diagram 600 illustrates the normalized time domain response of the communication channel (e.g., the time domain channel response) at various time delays (e.g., $\tau_0$, $\tau_1$, $\tau_2$, $\tau_3$, $\tau_4$). In some cases, the UE may select the top M time delays (e.g., positions) as the time domain basis functions. As a concrete example, if M is equal to 3, the time domain positions may include $\tau_0$, $\tau_1$, and $\tau_3$.

In some other examples, the UE may use an iterative approach to find M time positions (e.g., a matching pursuit). For example, the UE may iteratively evaluate different time delay combinations and select a combination of time delays for which the expected mean square error (MSE) of the estimated channel is reduced. In some examples, during each iteration (e.g., at each round) the UE may loop over a configured or predefined quantity (m) of available time positions (e.g., $\tau_0$, $\tau_1$, $\tau_2$, $\tau_3$, $\tau_4$, where m is equal to 6) and evaluate the expected MSE, for example if each of the available time positions were to be added to a subset of time positions. The UE may use the expected MSE to determine a time position to be added (e.g., selected) during the respective iteration (e.g., round) and continue iterating, for example until a desired quantity (M) of positions are selected. In some examples, the UE may also perform a refinement stage. For example, the UE may loop over M selected time positions and, during each iteration, remove one time position (e.g., from the set of M time positions) and search for another (e.g., not yet selected) time position of the quantity (m) of available time positions such that the MSE would be improved. In some cases, if the MSE is (e.g., actually) improved with the other time position, the UE may replace the removed time position with the other time position.

In some examples, the UE may indicate the selected time positions as the time domain basis functions to the network entity. In some cases, the indication may be direct or in a differential manner (e.g., the indication may correspond to a difference from a previous state). In some cases, the network entity may signal, to the UE, the quantity (M) of time positions to be used. In some other cases, the UE may report the quantity of time positions (M) to the network entity. Further, the network entity may signal, to the UE, a time domain granularity to be used (e.g., for determining the time domain basis functions) or the UE may report a time domain granularity to the network entity. Additionally or alternatively, the network entity may signal a desired (e.g., target) accuracy of the report (e.g., a desired MSE for the compressed channel response) and the UE may determine a quantity of time positions or a time domain granularity based on the desired MSE. In some cases, the UE may report the quantity of time positions or time domain granularity to the network entity. In some examples, the quantity of time positions or time domain granularity may be used by the network entity to reconstruct the time domain response of the channel. Additionally or alternatively, the network entity may indicate a codebook of time domain basis functions to the UE. In such an example, the UE may select the set of time domain basis functions from the indicated codebook. Additionally or alternatively, the UE may report indices of the selected time domain basis functions of the codebook to the network entity.

In some cases, the UE may signal periodically updated basis functions (e.g., the time domain basis functions or the spatial domain basis functions), for example where the update interval is based on a predefined value (e.g., separately) determined by both the network entity and the UE, a predefined value selected by the UE based on the mobility state of the UE, the velocity of the UE, or a value configured by the network entity (e.g., via an RRC message). In such cases, each indication may have a specific periodicity. In some other cases, the basis functions may be updated a-periodically, for example, the UE or network entity may request an a-periodic update of the basis vectors based on a change in communication bandwidth or a reduced target accuracy of the report or a reduced MSE (e.g., decline in the measured MSE). In such cases, each indication may be communicated using a downlink control information (DCI), a MAC-CE, or an RRC message.

In some examples, the spatial model (e.g., the time-space model) may be evaluated using the time domain response of the channel or the frequency domain response of the channel. For example, the spatial model may be generated based on a spatial behavior of the time domain response of the channel or the frequency domain response of the channel. In some examples, the spatial model may correspond to (e.g., involve) each time domain delay (e.g., tap) over space expressed as a linear combination of the spatial domain basis functions. In some examples, the spatial model may be represented by the following equation:

$$\begin{bmatrix} h_0^{TD}[m] \\ h_1^{TD}[m] \\ \vdots \\ h_{Np-1}^{TD}[m] \end{bmatrix} = \begin{bmatrix} U_{0,0} & U_{0,1} & \cdots & U_{0,Br-1} \\ U_{1,0} & U_{1,1} & \cdots & U_{1,Br-1} \\ \vdots & \vdots & \ddots & \vdots \\ U_{Np-1,0} & U_{Np-1,1} & \cdots & U_{Np-1,Br-1} \end{bmatrix} \cdot \begin{bmatrix} c_0[m] \\ c_1[m] \\ \vdots \\ c_{Br-1}[m] \end{bmatrix} \quad (10)$$

where, $h_i^{TD}[m]$ may represent the time domain response (e.g., time domain tap) of the channel measured at the (ith) antenna port of the UE (e.g., where i ranges from 0 to Np−1) and $c_j[m]$ may represent the time-space response of the estimated communication channel (e.g., where j ranges from 0 to Br−1). Additionally or alternatively, each matrix $U_{i,j}$ may represent the spatial domain basis functions. As such, the involvement of each time domain response ($h_i^{TD}[m]$) across the antennas (e.g., space) map be represented using a quantity of basis functions (Br) less than the quantity of frequency domain coefficients (e.g., Br<Np). As illustrated by equation 2, the Np values of the time domain responses may be described as a linear combination of the Br basis functions, and the Br weights of the linear combination may be the vector c (e.g., $c_0[m]$ through $c_{Br-1}[m]$). In some examples, different time domain responses ($h_i^{TD}[m]$) may use a same basis function (e.g., the U matrix), but a different c vector (e.g., weights).

In some examples, multiple techniques may be used to determine the spatial domain basis functions. Different techniques may be applied, for example for the antenna port arrays at the transmitting device or the network entity and the antenna port arrays at the receiving device or the UE, to select the spatial domain basis functions. In one example, the UE may select the spatial domain basis functions by evaluating an autocorrelation matrix, for example of the UE antenna port arrays or the network entity antenna port arrays. In some examples, the UE may evaluate the autocorrelation matrix by directly measuring the correlation between each pair of antenna ports (e.g., each pair of antenna ports at the UE or each pair of antenna ports at and the network entity). In some other examples, the UE may measure the lowest correlated pair of antenna ports (e.g., from the set of correlated pairs of antenna ports) and evaluate the correlation between the other correlated pairs of antenna ports (e.g., of the set of correlated pairs of antenna ports) using linear interpolation. For example, to select the spatial domain basis function based on the lowest correlated antenna ports the network entity may indicate a quantity (e.g., 2) antenna ports at an antenna array of the network entity with a lowest correlation (e.g., relative to other antenna ports at the respective antenna array). In response, the UE may evaluate the correlation between the indicated antenna ports and determine the spatial domain basis function based on the correlation value.

In yet some other examples, the UE may use the 2D topology of the antenna array (e.g., at the UE or at the network entity) as a model of the autocorrelation matrix. In such examples, the UE may measure the correlation of one or more pairs of ports (e.g., at the network entity) and extrapolate the correlation for the other pairs of antenna ports (e.g., of the set of correlated pairs of antenna ports at the network entity) assuming the correlation is of the form: $p=f_1 e^{-d*f_2}$, where $f_1$ and $f_2$ may correspond to parameters of the 2D topology model which may be adjusted to fit the model to observations and d may correspond to the distance between the correlated (e.g., two) antenna ports. In some examples, the correlation between antenna port pairs at the network entity may be measured (e.g., by the UE) using a type of reference signal (e.g., a CSI-RS) to determine the autocorrelation matrix for the network entity. In some other examples, another type of reference signal (e.g., an SRS) may be used (e.g., by the network entity) to determine the autocorrelation matrix for the UE. In some other cases, any downlink reference signal may be used to determine the autocorrelation matrix for the network entity and any uplink reference signal may be used to determine the autocorrelation matrix for the UE.

In some other examples, the UE may determine the spatial domain basis functions by performing a SVD for the spatial autocorrelation matrix. For example, the SVD may be expressed as:

$$[U, S, V] = svd(R_{bs}) \qquad (11)$$

where U, S, and V may each be an N×N matrix and $R_{bs}$ may be the autocorrelation matrix at the network entity.

In such an example, the UE may select the first B vectors (e.g., eigenvectors) corresponding to the largest B eigenvalues (e.g., of the set of eigenvalues). For example, the UE may find eigenvectors that correspond to a linear combination of antenna ports in which a relatively large amount of variations (e.g., in the channel response) may occur, for example compared to variations in the channel response for other linear combinations of antenna ports. In some examples, the selected eigenvectors (e.g., basis functions) may be represented as:

$$W = \begin{bmatrix} U_{0,0} & U_{0,1} & \cdots & U_{0,B-1} \\ U_{1,0} & U_{1,1} & \cdots & U_{1,B-1} \\ \vdots & \vdots & \ddots & \vdots \\ U_{Np-1,0} & U_{Np-1,1} & \cdots & U_{Np-1,B-1} \end{bmatrix}. \qquad (12)$$

In some examples, one or more signals may support evaluation of the autocorrelation matrix. For example, the network entity may indicate, to the UE (e.g., or the UE may indicate to the network entity), one or more antenna ports pairs with a relatively low correlation. In some examples, the network entity may indicate, to the UE (e.g., or the UE may indicate to the network entity), the 2D topology of the antenna array of the respective device. In other examples, the network entity may indicate the UE autocorrelation matrix to the UE. In some cases, the indication may be in a direct or in a differential manner (e.g., the indication may correspond to a difference from a previous state). In some examples, the network entity may indicate which of the antenna port pairs at the UE correspond to the lowest correlated antenna port pair, for example of the set of antenna port pairs. In some other examples, the network entity may indicate the 2D topology models (e.g., $f_1$ and $f_2$) to the UE.

In some examples, one or more signals may support selection of the spatial domain basis functions. For example, the network entity may indicate the quantity of spatial domain basis functions (e.g., $B_T$ or $B_R$) to be used to the UE. The network entity may indicate a desired accuracy of the report (e.g., a desired MSE for the compressed channel response) and the UE may determine a quantity of spatial domain basis functions (e.g., $B_T$ or $B_R$) based on the indicated MSE. In some cases, the UE may report the quantity of spatial domain basis functions to be used to the network entity. In other cases, the network entity may indicate spatial domain basis function values for the receive antenna or indices of a predefine set of basis functions to the UE. In further cases, the indication may be direct or in a differential manner (e.g., the indication may correspond to a difference from a previous state). The UE may indicate the transmit antenna basis function values or the indices of a predefine set of basis functions to the network entity. In some examples, the indication may be in a direct or in a differential manner (e.g., the indication may correspond to a difference from a previous state). In some examples, each optional indication may be transmitted periodically (e.g., with a dedicated periodicity for each indication type) or a-periodically. For example, the indications may be communicated using a DCI, a MAC-CE, or an RRC message.

In some examples, the spatial model may be separately written from the perspective of the transmitting device (e.g., the network entity) as:

$$\begin{bmatrix} h_{0,rx}^{TD}[m] \\ h_{1,rx}^{TD}[m] \\ \vdots \\ h_{N_p^{TX}-1,rx}^{TD}[m] \end{bmatrix} = \begin{bmatrix} U_{0,0} & U_{0,1} & \cdots & U_{0,B_T-1} \\ U_{1,0} & U_{1,1} & \cdots & U_{1,B_T-1} \\ \vdots & \vdots & \ddots & \vdots \\ U_{N_p^{TX}-1,0} & U_{N_p^{TX}-1,1} & \cdots & U_{N_p^{TX}-1,B_T-1} \end{bmatrix} \cdot \begin{bmatrix} c_0[m] \\ c_1[m] \\ \vdots \\ c_{B_T-1}[m] \end{bmatrix} \quad (13)$$

and from the perspective of the receiving device (e.g., the UE) as:

$$\begin{bmatrix} h_{tx,0}^{TD}[m] \\ h_{tx,1}^{TD}[m] \\ \vdots \\ h_{tx,N_p^{RX}-1}^{TD}[m] \end{bmatrix} = \begin{bmatrix} U_{0,0} & U_{0,1} & \cdots & U_{0,B_R-1} \\ U_{1,0} & U_{1,1} & \cdots & U_{1,B_R-1} \\ \vdots & \vdots & \ddots & \vdots \\ U_{N_p^{RX}-1,0} & U_{N_p^{RX}-1,1} & \cdots & U_{N_p^{RX}-1,B_R-1} \end{bmatrix} \cdot \begin{bmatrix} c_0[m] \\ c_1[m] \\ \vdots \\ c_{B_R-1}[m] \end{bmatrix} \quad (14)$$

where $h_{i,rx}^{TD}[m]$ and $h_{tx,i}^{TD}[m]$ may represent the time domain response of the channel measured at the (ith) antenna port of the network entity and the UE, respectively (e.g., where i ranges from 0 to Np−1) and $c_i[m]$ represents the time-space response of the estimated channel.

In such an example, the time domain response of the channel may be written as:

$$\begin{bmatrix} h_{0,rx}^{FD} \\ h_{1,rx}^{FD} \\ \vdots \\ h_{Np-1,rx}^{FD} \end{bmatrix} = \begin{bmatrix} F_c & 0 & 0 & 0 \\ 0 & F_c & 0 & 0 \\ 0 & 0 & \ddots & 0 \\ 0 & 0 & 0 & F_c \end{bmatrix} \cdot \begin{bmatrix} h_{0,rx}^{TD} \\ h_{1,rx}^{TD} \\ \vdots \\ h_{Np-1,rx}^{TD} \end{bmatrix} + n \quad (15)$$

and the 2D model (e.g., time-space model) may be expressed as a Kronecker product of the time domain response of the channel and the spatial model. For example, the 2D model may be written as:

$$h^{FD} = \begin{bmatrix} h_{0,0}^{FD} \\ h_{1,0}^{FD} \\ \vdots \\ h_{N_p^{TX}-1,N_p^{RX}}^{FD} \end{bmatrix} \quad (16)$$

$$= \left( \begin{bmatrix} F_c & 0 & 0 & 0 \\ 0 & F_c & 0 & 0 \\ 0 & 0 & \ddots & 0 \\ 0 & 0 & 0 & F_c \end{bmatrix} \otimes \begin{bmatrix} U_{0,0} & U_{0,1} & \cdots & U_{0,B_T-1} \\ U_{1,0} & U_{1,1} & \cdots & U_{1,B_T-1} \\ \vdots & \vdots & \ddots & \vdots \\ U_{N_p^{TX}-1,0} & U_{N_p^{TX}-1,1} & \cdots & U_{N_p^{TX}-1,B_T-1} \end{bmatrix} \otimes \begin{bmatrix} U_{0,0} & U_{0,1} & \cdots & U_{0,B_R-1} \\ U_{1,0} & U_{1,1} & \cdots & U_{1,B_R-1} \\ \vdots & \vdots & \ddots & \vdots \\ U_{N_p^{RX}-1,0} & U_{N_p^{RX}-1,1} & \cdots & U_{N_p^{RX}-1,B_R-1} \end{bmatrix} \right)$$

$$\begin{bmatrix} c_{0,0} \\ c_{1,1} \\ \vdots \\ c_{B_T-1,B_R-1} \end{bmatrix} + n$$

$$= A \cdot c + n$$

Here, c may be a vector which represents the channel coefficients, A may represent the 2D model, $\sigma^2$ may represent the noise energy (e.g., SNR), I may represent an identity matrix, and $h^{FD}$ may represent the measured frequency domain response of the channel. That is, equation 8 may describe the relationship between the measured frequency domain response of the channel ($h^{FD}$) and the channel coefficients (c) that express the compressed channel response. In some examples, the values of the channel coefficients (e.g., the vectors, c) may be calculated using the LMMSE of the following equation:

$$c = \left(A^H \cdot A + \sigma^2 I\right)^{-1} A^H \cdot h^{FD} \quad (17)$$

Additionally or alternatively, the channel coefficients (c) may be calculated per CSF report using the LMMSE solution (e.g., adaptive of the SNR).

In some examples, the UE may dynamically evaluate different combinations of channel compression parameters to determine a channel compression configuration that may reduce the expected error (e.g., MSE). For example, dynamic configuration of the channel compression may be used such that, for a given report size, the UE may dynamically (e.g., per report) evaluate one or more configuration options (e.g., with a report size smaller or equal to a predetermined size), select an option with a desirable performance (e.g., a reduced MSE), and transmit a report (e.g., an indication of a set of channel coefficients) accordingly. In some examples, dynamically evaluating different combinations of channel compression parameters may improve performance, for example by improving the tradeoff between the channel compression parameters (e.g., per realized channel response). In some examples, the parameters that may be considered for dynamic configuration may include a quantity of spatial domain basis functions, a quantity of spatial domain basis function indices (e.g., corresponding to one or more predefined spatial domain basis functions), a quantity of time domain basis functions, or a quantity of quantization bits.

In some examples, one or more options may be considered to achieve reduced signaling overhead. For example, the time domain basis functions and the spatial domain basis functions may be ordered with respect to a respective expected contribution to performance. In some examples, as the quantity of basis functions increases, the accuracy of the compressed channel estimation also increases. However, the contribution of each basis function for an achieved accuracy may not be the same. Therefore, the basis functions may be ordered according to an expected contribution (e.g., according to a corresponding eigenvalue order) such that if the UE determines (e.g., dynamically) to reduce the quantity of basis functions to a quantity (K) the UE may select the top K basis functions from the ordered list. Thus, rather than reporting the selected basis functions (e.g., K indices each corresponding to a selected basis function), the UE may report the value K thereby reducing overhead.

The quantity of time domain basis functions and the quantity of spatial domain basis functions may be dynamically signaled (e.g., to the UE) and selected according to the ordering. The UE may switch between one or more different configuration sets (e.g., sets of parameters for dynamic configuration) for example, using a dedicated set selection parameter. In some examples, each configuration option may be determined based on the quantity of time domain basis functions or the quantity of spatial domain basis functions. In some examples, the quantity of time domain basis functions or the quantity of spatial domain basis functions may be indicated (e.g., jointly) with the quantity of quantized bits (e.g., the quantity of bits to be used for quantization). In some examples, one or more basis functions (e.g., spatial domain basis functions or time domain basis functions) may be replaced, by the UE, using one or more dedicated parameters.

In some examples, the network entity may indicate, to the UE, an ordering of spatial domain basis functions from which the UE may dynamically select one or more spatial domain basis functions to be used in the spatial model. In some examples, the UE may report the selected spatial domain basis functions or an ordering of the selected spatial domain basis functions to the network entity (e.g., for reconstructing the spatial model). The network entity may indicate an ordering of time domain basis functions from which the UE may dynamically select one or more time domain basis functions to be used in the time domain response of the channel. In some examples, the UE may report the selected time domain basis functions or an ordering of the selecting time domain basis functions to the network entity (e.g., for reconstructing the time domain response of the channel). The network entity may indicate a list of configuration sets (e.g., one or more configurations including a set of spatial domain basis functions and a of time domain basis functions) from which the UE may dynamically select a configuration to be used to determine the time domain response of the channel and the spatial model. In some examples, the UE may report the selected configuration to the network entity. Each configured set may include a quantity of spatial domain basis functions, a quantity of time domain basis functions, or a quantity of bits to use for quantization. In some examples, the UE may report the selected configuration to the network entity. In some examples, the network entity may indicate a quantity of time domain basis functions, a quantity of spatial domain basis functions, or a quantity of bits to use for quantization to the UE. In some other examples, the UE may report the quantity of time domain basis functions, the quantity of spatial domain basis functions, or the quantity of bits to use for quantization to the network entity. In some examples, one or more of the indications may be indicated via a DCI, a MAC-CE, or a RRC message.

Figure 7A:
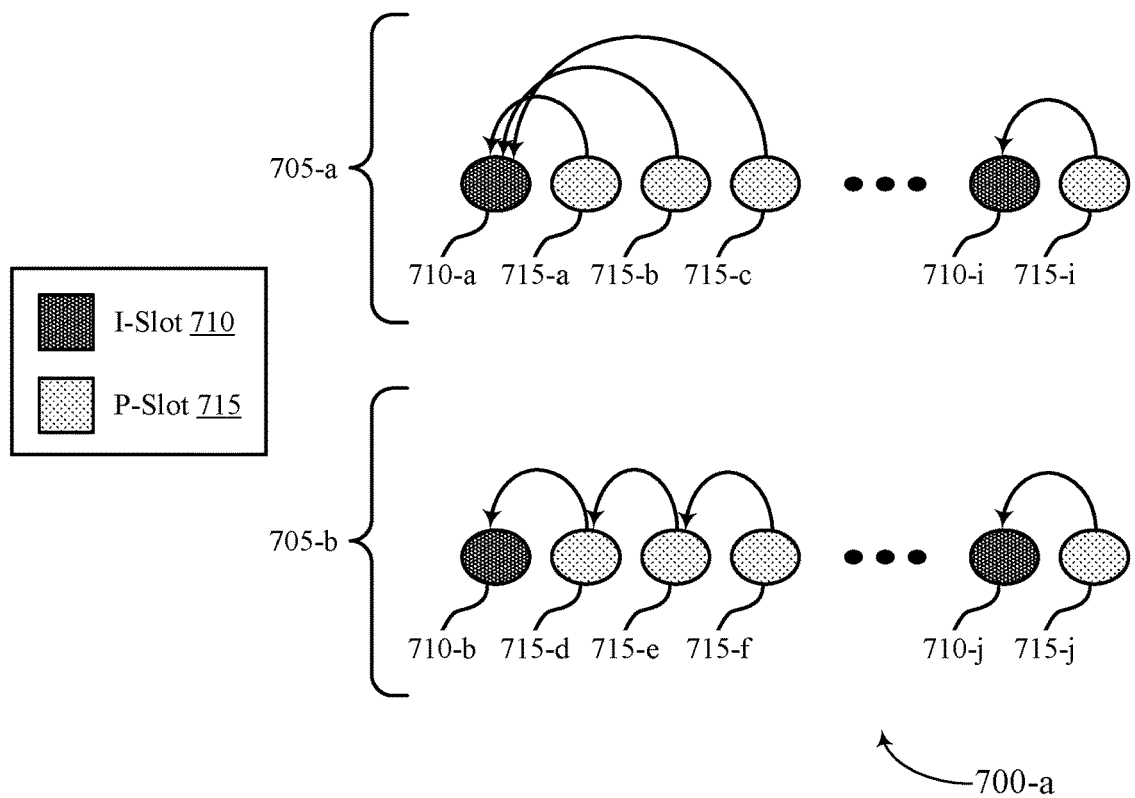
FIGS. 7A and 7B each illustrate an example of a differential encoding scheme that supports multi-user channel prediction for mobility scenarios in accordance with one or more aspects of the present disclosure.
Figure 7B:
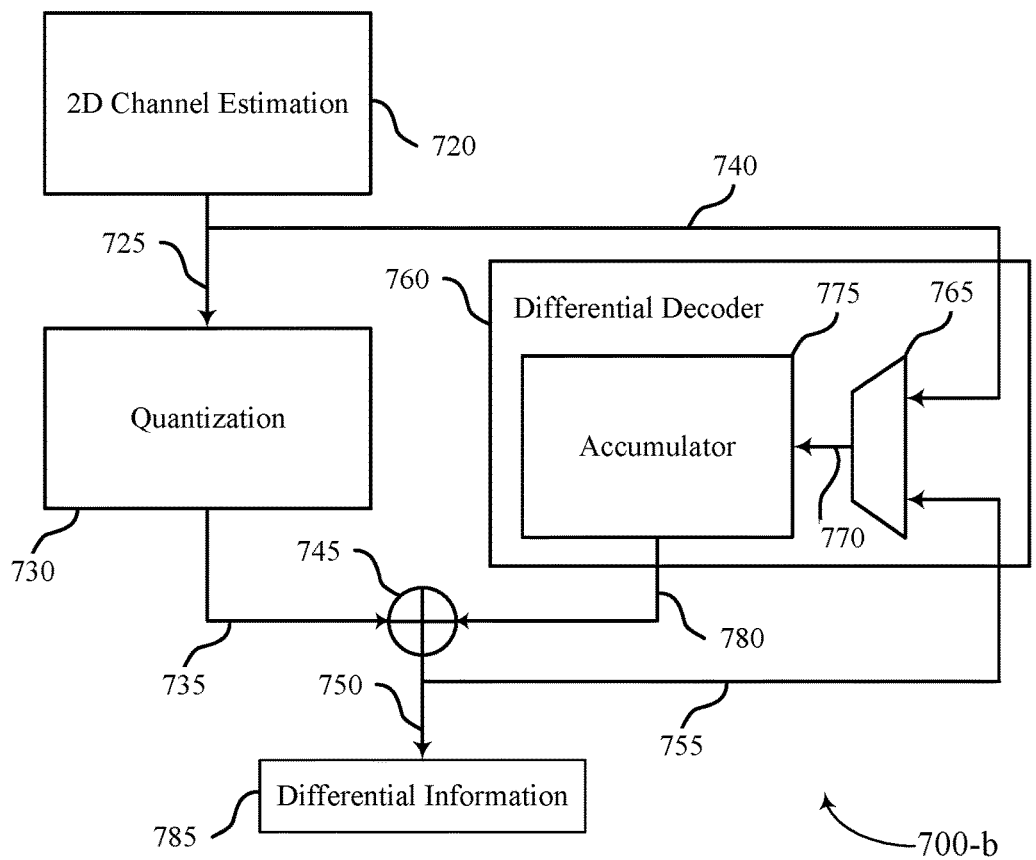

FIGS. 7A and 7B each illustrate an example of a differential encoding scheme 700 that supports multi-user channel prediction for mobility scenarios in accordance with one or more aspects of the present disclosure. In some examples, differential encoding schemes 700 (e.g., a differential encoding scheme 700-*a* and a differential encoding scheme 700-*b*) may include aspects of the wireless communications systems 100 and 200 described with respect to FIGS. 1 and 2, respectively. For example, the differential encoding schemes 700 may be implemented by a UE 115 which may be an example of the correspond device described with reference to FIGS. 1 and 2.

As illustrated in the example of FIG. 7A, a UE may use differential encoding to increase the accuracy at which the set of channel coefficients represents the estimated channel. In some cases of differential encoding, the UE may send (e.g., indicate) the channel coefficients at a reduced periodicity, for example at intra-coded slots (e.g., I-slots 710, such as I-slot 710-*a*, 710-*b*, 710-*i*, and 710-*j*), and send (e.g., indicated) changes in the set of channel coefficients at inter-coded slots (e.g., P-slots, such as P-slot 715-*a*, 715-*b*, 715-*c*, 715-*d*, 715-*e*, 715-*f*, 715-*i*, and 715-*j*). In other words, differential encoding may include sending the channel coefficients at a low periodicity at "Intra-coded slots" ("I-slots") and sending the changes in the coefficients at the other "Inter-coded slots" ("P-slots"). In the example of differential encoding option 705-*a*, the change in channel coefficients indicated at a given P-slot 715 (e.g., a P-slot 715-*b*) may be measured relative to the value of the channel coefficients measured at an anchor slot (e.g., an I-slot 710-*a*). For example, the channel coefficients may be differential with respect to an anchor slot (I-slot). In the example of differential encoding option 705-*b*, the change in channel coefficients indicated at a given P-slot 715 (e.g., a P-slot 715-*e*) may be measured relative to a previous slot (e.g., a P-slot 715-*d*). For example, the channel coefficients may be differential with respect to the previous slot. In some cases, the changes may be measured from the reconstructed channel at the receiver (e.g., from the perspective of the network entity).

As illustrated in the example of FIG. 7B, a UE may perform 2D channel estimation 720 to obtain a set of channel coefficients. At 725, the UE may compress the set of channel coefficients using quantization 730. In some examples, the 2D channel estimation and the quantization 730 may be examples of the corresponding processes described with reference to FIG. 5. In some examples, channel coefficients corresponding to a reconstructed channel (e.g., reconstructed channel coefficients) may be subtracted from the quantized set of channel coefficients, at 735, to calculate a set of differential channel coefficients (e.g., via an operator 745). In some examples, the operator 745 may output the set of differential channel coefficients at 750 to differential information 785 to be transmitted on P-slots. In some cases, the P-slots may be examples of P-slots described with reference to FIG. 7A. Additionally or alternatively, at 755 the set of differential channel coefficients may be input into a differential decoder 760. For example, the set of differential channel coefficients may be input into a multiplexor 765. At 740 the set of channel coefficients generated from the 2D channel estimation 720 (e.g., the set of channel coefficients to be transmitted in I-slots) may be input into the differential decoder 760. In some cases, the I-slots may be examples of I-slots described with reference to FIG. 7A. For example, the set of channel coefficients may be input into a multiplexor 765. In some cases, the set of channel coefficients may be multiplexed with the set of differential channel coefficients via the multiplexor 765. At 770, the output of the multiplexor 765 may be input (e.g., and stored) in an accumulator 775. In some examples, the accumulator 775 may reset on I-slots (e.g., the anchor slots). At 780, the output of the accumulator 775 (e.g., the reconstructed channel coefficients) may be subtracted from a quantized set of channel coefficients via the operator 745 and the output may correspond to the set of differential channel coefficients measured with respect to a previous P-slot.

Figure 8:
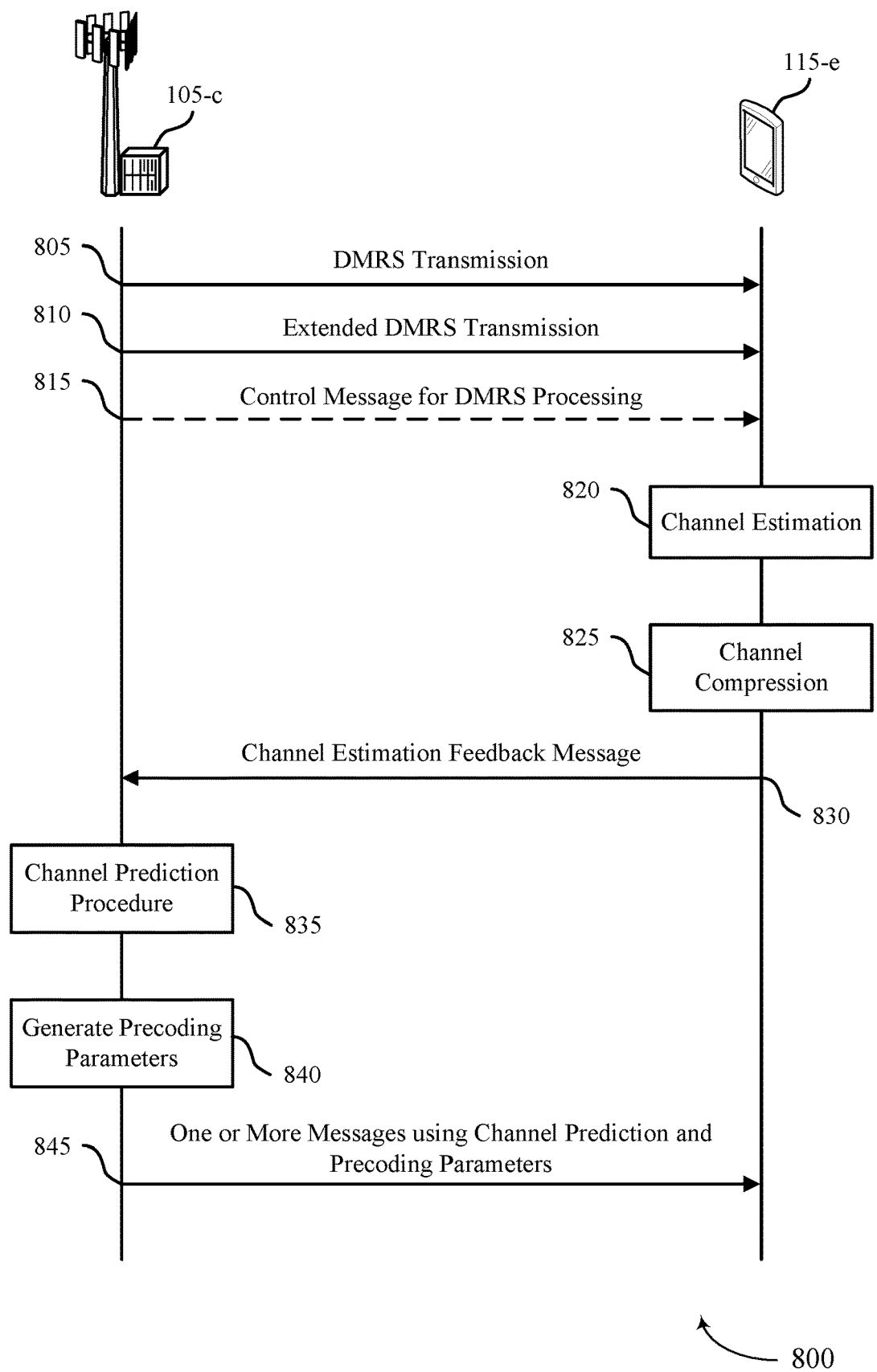
FIG. 8 illustrates an example of a process flow that supports multi-user channel prediction for mobility scenarios in accordance with one or more aspects of the present disclosure.

FIG. 8 illustrates an example of a process flow 800 that supports multi-user channel prediction for mobility scenarios in accordance with one or more aspects of the present disclosure. In some examples, process flow 800 may implement aspects of wireless communications system 100 and wireless communications system 200. Process flow 800 includes a UE 115-e and a network entity 105-c which may be respective examples of a UE 115 and a network entity 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 800 shows processes between a single UE 115 and a single network entity 105, it should be understood that these processes may occur between any quantity of network devices and network device types. For example, the process flow 800 may be adapted in which the network entity 105-c communicates with a set of UEs 115 via MU-MIMO communication techniques described herein.

At 805, the network entity 105-c may transmit, via a first time slot, a DMRS (e.g., a first DMRS) that may be precoded according to a first set of precoding parameters for the UE 115-e. In examples of MU-MIMO communications, the network entity 105-c may transmit, via the first time slot, a first set of DMRSs precoded according to the first set of precoding parameters, where each DMRS of the first set of DMRSs may be associated with a respective UE 115 of a set of UEs 115 that includes the UE 115-e.

At 810, the network entity 105-c may transmit, via the first time slot, an extended DMRS (e.g., a second DMRS) that may be precoded according to a second set of precoding parameters for the UE 115-e. In examples of MU-MIMO communications, the network entity 105-c may transmit, via the first time slot, a second set of DMRSs precoded according to the second set of precoding parameters, where each DMRS of the second set of DMRSs may be associated with a respective UE 115 of the set of UEs 115. In some examples, the first set of precoding parameters may be different from (e.g., orthogonal to) the second set of precoding parameters.

At 815, the network entity 105-c may transmit a control message indicating a set of information for processing the DMRS for decoding at the UE 115-e (e.g., or set of UEs 115) and processing the extended DMRS.

At 820, the UE 115-e may perform channel estimation using the DMRS at 805 and the extended DMRS at 810. In some examples, the channel estimation may include a set of coefficients associated with a precoded channel response. In examples of MU-MIMO communications, the UE 115-e may receive one or more additional DMRSs and extended DMRSs associated with one or more second UEs 115. As such, the UE 115-e may perform the channel estimation based on the one or more additional DMRSs and extended DMRSs.

At 825, the UE 115-e may perform channel compression. For example, the UE 115-e may measure a frequency domain response of a channel associated with receiving the DMRS and the extended DMRS, and generate a time domain response based on the frequency domain response of the channel. Additionally, the UE 115-e may generate a spatial model on the time domain response or the frequency domain response of the channel. In some examples, a feedback message (e.g., channel estimation feedback message, at 830) may include a two dimensional time and space domain response of the channel based on the time domain response and the spatial model.

In some examples, the channel estimation information may include a set of differential channel coefficients associated with a coding parameter. In such examples, each differential channel coefficient of the set of differential channel coefficients may include a channel coefficient difference relative to a respective channel coefficient of a set of channel coefficients associated with one or more slots prior to the first time slot.

At 830, the UE 115-e may transmit a feedback message indicating channel estimation information of the UE 115-e based on the DMRS and the extended DMRS. In some examples, the UE 115-e may transmit the feedback message via a PUCCH or a PUSCH. Additionally or alternatively, the UE 115-e may transmit the feedback message using a first set of frequency resources concurrently to receiving data using a second set of frequency resources different from the first set of frequency resources (e.g., via a full-duplex mode).

In some examples, the network entity 105-c may additionally receive, prior to receiving the feedback message, one or more other feedback messages, where the one or more other feedback messages are associated with a respective time slot prior to the first time slot. In examples of MU-MIMO communications, the network entity 105-c may receive from the set of UEs 115, respective feedback messages indicating respective channel estimation information based on the first set of DMRSs and the second set of DMRSs.

At 835, the network entity 105-c may perform a channel prediction procedure for a second time slot subsequent to the first time slot based on the feedback message and the one or more other feedback messages for the UE 115-e. For example, the network entity 105-c may predict, for the second time slot, a channel response vector based on a set of channel coefficients indicated by the channel estimation information, where the channel response vector may be associated with one or more antenna ports of a set of antenna ports. Additionally or alternatively, the network entity 105-c may combine one or more previous channel estimation information associated with the one or more other feedback messages to generate the channel response vector. In examples of MU-MIMO communications, the network entity 105-c may generate a MU-MIMO channel prediction based on the respective feedback messages (e.g., including feedback messages for prior time slots) from the respective UEs 115.

At 840, the network entity 105-c may generate the third set of precoding parameters based on the channel response vector. In examples of MU-MIMO communications, the network entity 105-c may generate a MU-MIMO channel precoder associated with the set of UEs 115 based on the MU-MIMO channel prediction.

At 845, the network entity 105-c may transmit, via the second time slot, one or more messages that may be precoded according to the third set of precoding parameters, the third set of precoding parameters predicted based on the channel estimation information and the channel prediction procedure.

Figure 9:
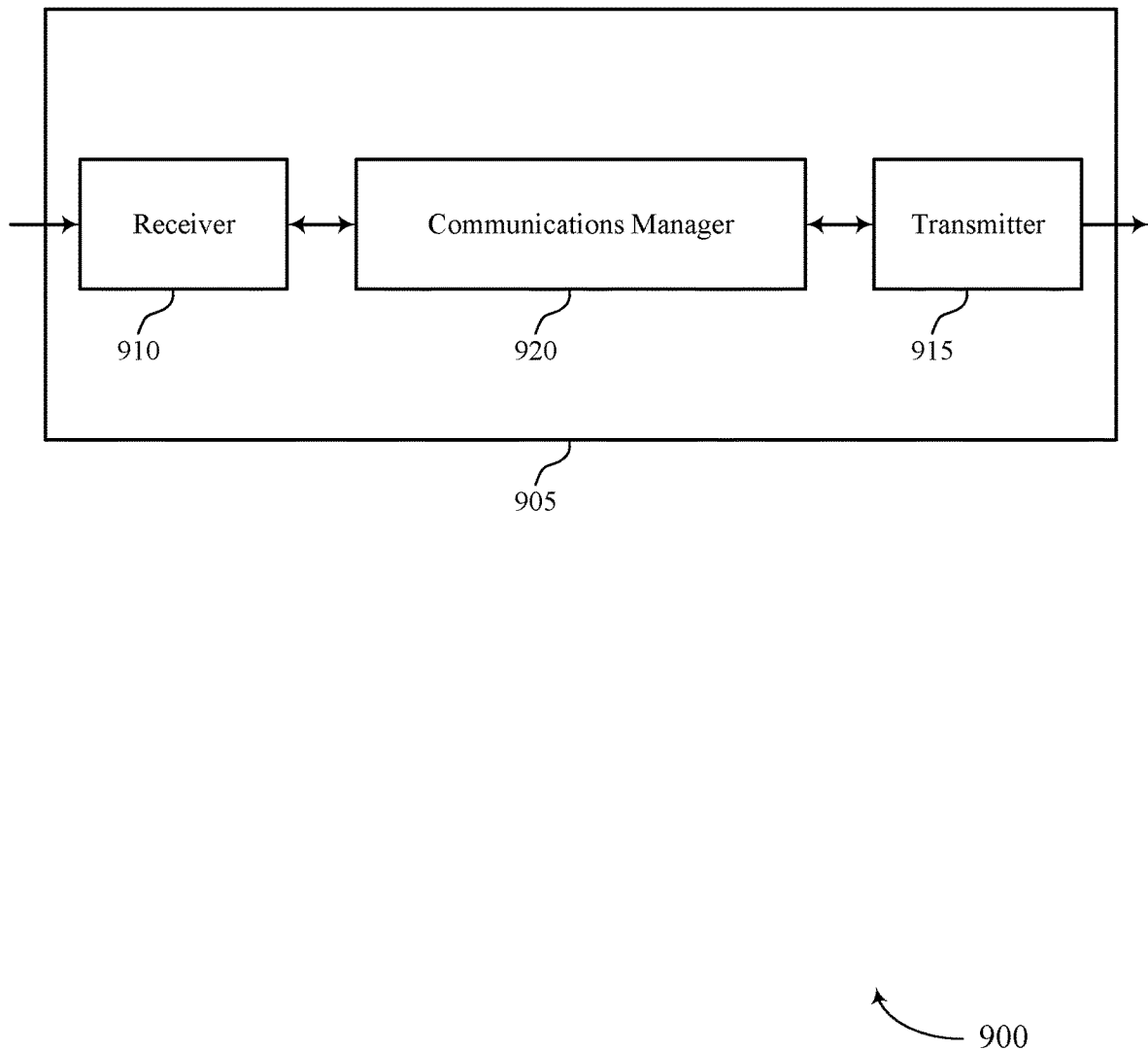
FIGS. 9 and 10 illustrate block diagrams of devices that support multi-user channel prediction for mobility scenarios in accordance with one or more aspects of the present disclosure.

FIG. 9 illustrates a block diagram 900 of a device 905 that supports multi-user channel prediction for mobility scenarios in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of multi-user channel prediction for mobility scenarios as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 may be configured as or otherwise support a means for transmitting, via a first time slot, a first DMRS that is precoded according to a first set of precoding parameters for a UE. The communications manager 920 may be configured as or otherwise support a means for transmitting, via the first time slot, a second DMRS that is precoded according to a second set of precoding parameters for the UE. The communications manager 920 may be configured as or otherwise support a means for receiving a feedback message indicating channel estimation information for the UE based on the first DMRS and the second DMRS. The communications manager 920 may be configured as or otherwise support a means for performing, based on the feedback message and one or more other feedback messages for the UE, a channel prediction procedure for a second time slot subsequent to the first time slot. The communications manager 920 may be configured as or otherwise support a means for transmitting, via the second time slot, one or more messages that are precoded according to a third set of precoding parameters, the third set of precoding parameters predicted based on the channel estimation information and the channel prediction procedure.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources.

Figure 10:
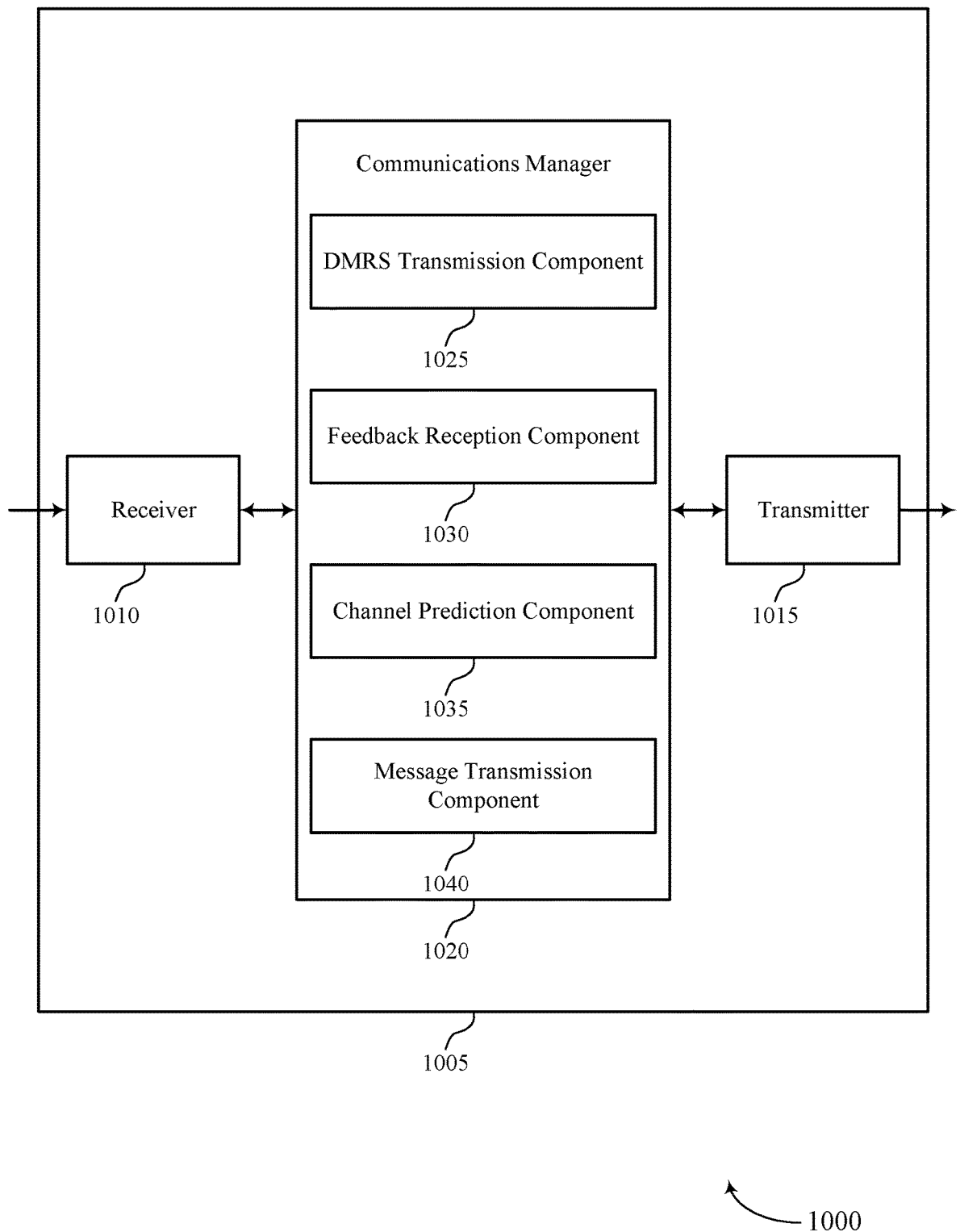

FIG. 10 illustrates a block diagram 1000 of a device 1005 that supports multi-user channel prediction for mobility scenarios in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of multi-user channel prediction for mobility scenarios as described herein. For example, the communications manager 1020 may include a DMRS transmission component 1025, a feedback reception component 1030, a channel prediction component 1035, a message transmission component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The DMRS transmission component 1025 may be configured as or otherwise support a means for transmitting, via a first time slot, a first DMRS that is precoded according to a first set of precoding parameters for a UE. The DMRS transmission component 1025 may be configured as or otherwise support a means for transmitting, via the first time slot, a second DMRS that is precoded according to a second set of precoding parameters for the UE. The feedback reception component 1030 may be configured as or otherwise support a means for receiving a feedback message indicating channel estimation information for the UE based on the first DMRS and the second DMRS. The channel prediction component 1035 may be configured as or otherwise support a means for performing, based on the feedback message and one or more other feedback messages for the UE, a channel prediction procedure for a second time slot subsequent to the first time slot. The message transmission component 1040 may be configured as or otherwise support a means for transmitting, via the second time slot, one or more messages that are precoded according to a third set of precoding parameters, the third set of precoding parameters predicted based on the channel estimation information and the channel prediction procedure.

Figure 11:
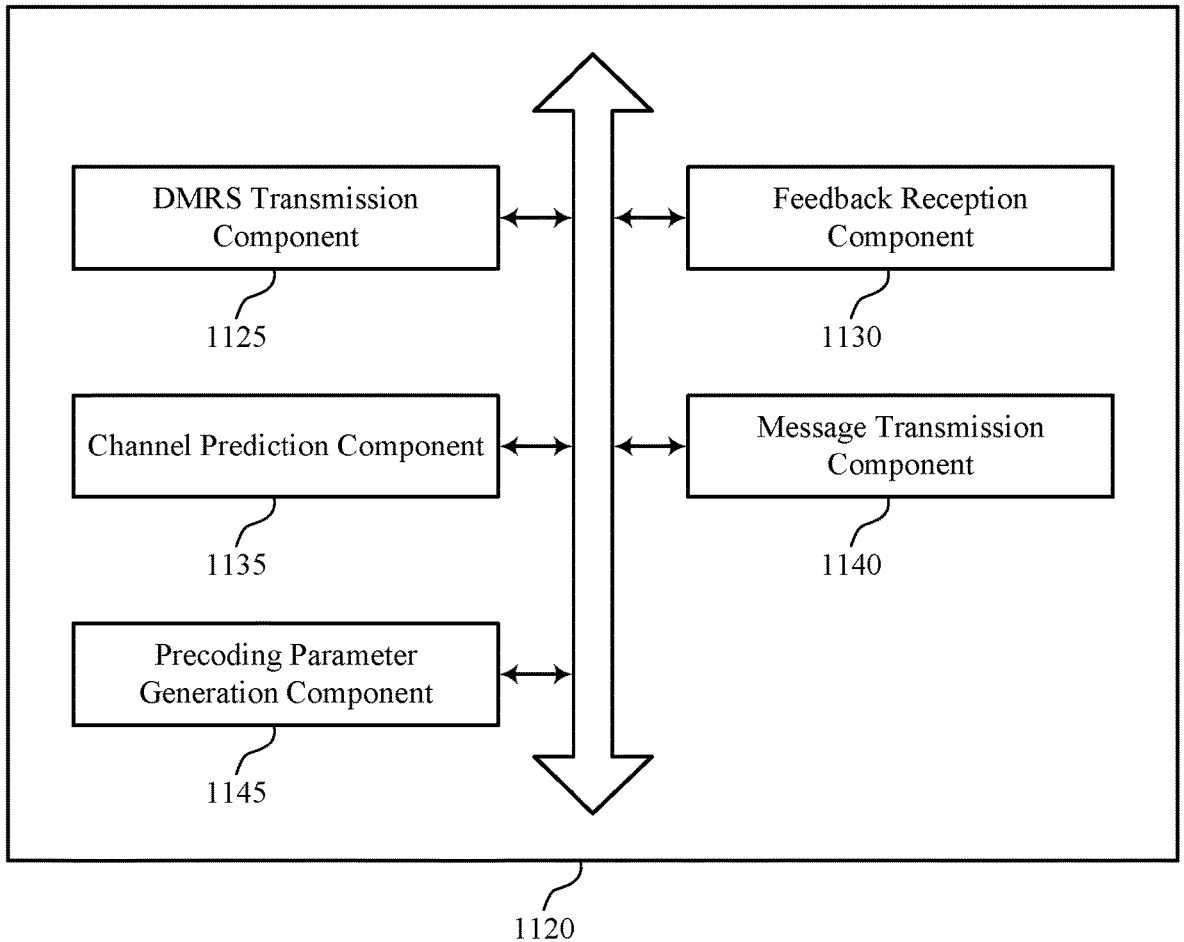
FIG. 11 illustrates a block diagram of a communications manager that supports multi-user channel prediction for mobility scenarios in accordance with one or more aspects of the present disclosure.

FIG. 11 illustrates a block diagram 1100 of a communications manager 1120 that supports multi-user channel prediction for mobility scenarios in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of multi-user channel prediction for mobility scenarios as described herein. For example, the communications manager 1120 may include a DMRS transmission component 1125, a feedback reception component 1130, a channel prediction component 1135, a message transmission component 1140, a precoding parameter generation component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The DMRS transmission component 1125 may be configured as or otherwise support a means for transmitting, via a first time slot, a first DMRS that is precoded according to a first set of precoding parameters for a UE. In some examples, the DMRS transmission component 1125 may be configured as or otherwise support a means for transmitting, via the first time slot, a second DMRS that is precoded according to a second set of precoding parameters for the UE. The feedback reception component 1130 may be configured as or otherwise support a means for receiving a feedback message indicating channel estimation information for the UE based on the first DMRS and the second DMRS. The channel prediction component 1135 may be configured as or otherwise support a means for performing, based on the feedback message and one or more other feedback messages for the UE, a channel prediction procedure for a second time slot subsequent to the first time slot. The message transmission component 1140 may be configured as or otherwise support a means for transmitting, via the second time slot, one or more messages that are precoded according to a third set of precoding parameters, the third set of precoding parameters predicted based on the channel estimation information and the channel prediction procedure.

In some examples, to support performing the channel prediction procedure, the channel prediction component 1135 may be configured as or otherwise support a means for predicting, for the second time slot, a channel response vector based on a set of channel coefficients indicated by the channel estimation information, the channel response vector associated with one or more antenna ports of a set of antenna ports. In some examples, to support performing the channel prediction procedure, the precoding parameter generation component 1145 may be configured as or otherwise support a means for generating the third set of precoding parameters based on the channel response vector, the one or more messages precoded in accordance with the third set of precoding parameters.

In some examples, to support predicting the channel response vector, the channel prediction component 1135 may be configured as or otherwise support a means for combining one or more previous channel estimation information associated with the one or more antenna ports of the set of antenna ports, the one or more previous channel estimation information associated with the one or more other feedback messages.

In some examples, the feedback reception component 1130 may be configured as or otherwise support a means for receiving, prior to receiving the feedback message, the one or more other feedback messages, where the feedback message and each feedback message of the one or more other feedback messages is associated with a respective time slot prior to the first time slot.

In some examples, to support transmitting the one or more messages, the message transmission component 1140 may be configured as or otherwise support a means for transmitting, via the second time slot, the one or more messages based on receiving the one or more other feedback messages.

In some examples, the message transmission component 1140 may be configured as or otherwise support a means for transmitting a control message indicating a set of information for processing the first DMRS for decoding at the UE and processing the second DMRS.

In some examples, the first set of precoding parameters is different from the second set of precoding parameters associated with the second DMRS.

In some examples, the DMRS transmission component 1125 may be configured as or otherwise support a means for transmitting, via the first time slot, a first set of DMRSs precoded according to the first set of precoding parameters, where each DMRS of the first set of DMRSs is associated with a respective UE of a set of UEs that includes the UE. In some examples, the DMRS transmission component 1125 may be configured as or otherwise support a means for transmitting, via the first time slot, a second set of DMRSs precoded according to the second set of precoding parameters, where each DMRS of the second set of DMRSs is associated with a respective UE of the set of UEs. In some examples, the feedback reception component 1130 may be configured as or otherwise support a means for receiving from the set of UEs, respective feedback messages indicating respective channel estimation information based on the first set of DMRSs and the second set of DMRSs.

In some examples, the channel prediction component 1135 may be configured as or otherwise support a means for generating a MU-MIMO channel prediction based on the respective feedback messages. In some examples, the precoding parameter generation component 1145 may be configured as or otherwise support a means for generating a MU-MIMO channel precoder associated with the set of UEs based on the MU-MIMO channel prediction.

In some examples, the channel estimation information includes a set of coefficients associated with a precoded channel response.

Figure 12:
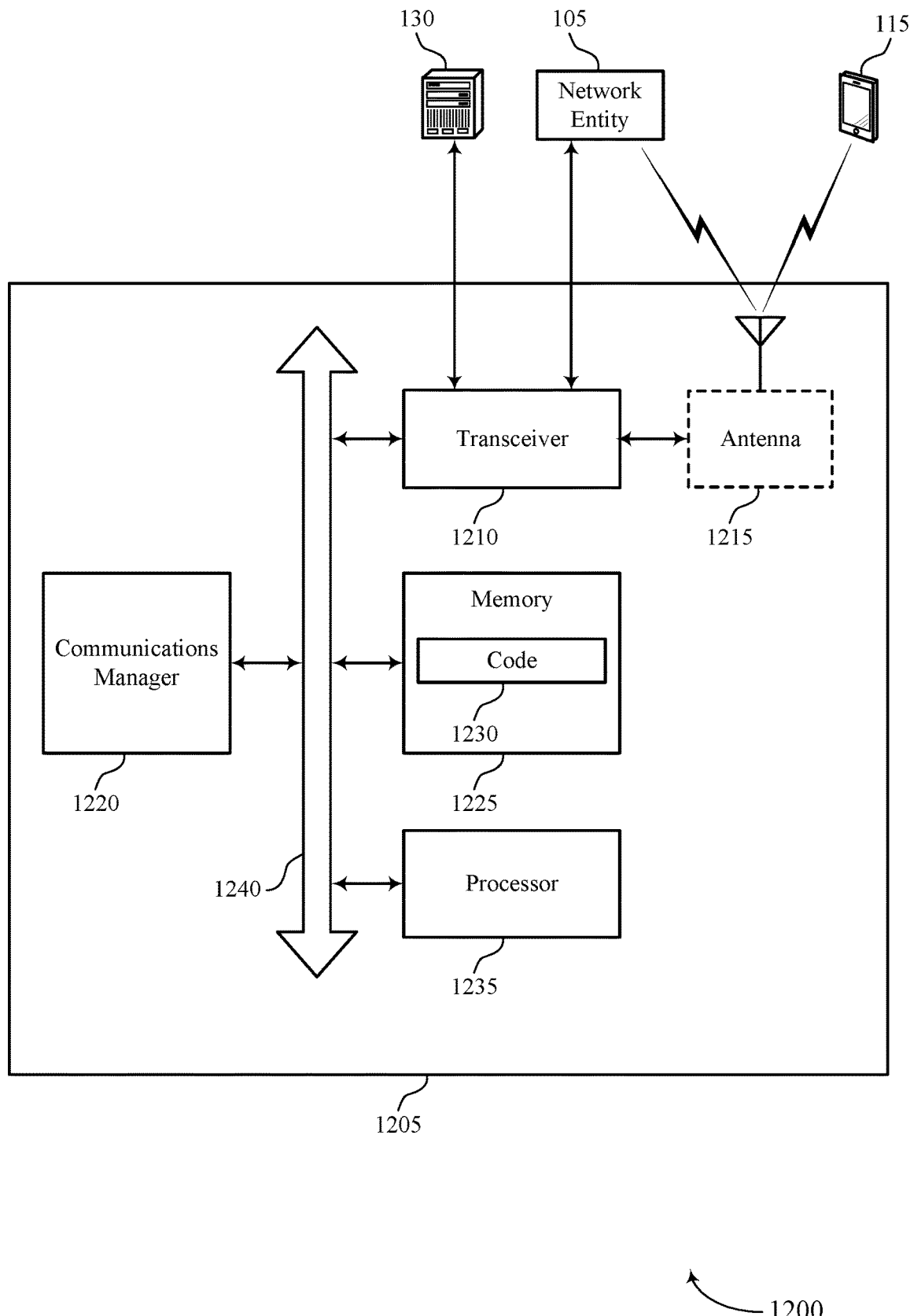
FIG. 12 illustrates a diagram of a system including a device that supports multi-user channel prediction for mobility scenarios in accordance with one or more aspects of the present disclosure.

FIG. 12 illustrates a diagram of a system 1200 including a device 1205 that supports multi-user channel prediction for mobility scenarios in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting multi-user channel prediction for mobility scenarios). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 may be configured as or otherwise support a means for transmitting, via a first time slot, a first DMRS that is precoded according to a first set of precoding parameters for a UE. The communications manager 1220 may be configured as or otherwise support a means for transmitting, via the first time slot, a second DMRS that is precoded according to a second set of precoding parameters for the UE. The communications manager 1220 may be configured as or otherwise support a means for receiving a feedback message indicating channel estimation information for the UE based on the first DMRS and the second DMRS. The communications manager 1220 may be configured as or otherwise support a means for performing, based on the feedback message and one or more other feedback messages for the UE, a channel prediction procedure for a second time slot subsequent to the first time slot. The communications manager 1220 may be configured as or otherwise support a means for transmitting, via the second time slot, one or more messages that are precoded according to a third set of precoding parameters, the third set of precoding parameters predicted based on the channel estimation information and the channel prediction procedure.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of multi-user channel prediction for mobility scenarios as described herein, or the processor 1235 and the memory 1225 may be otherwise configured to perform or support such operations.

Figure 13:
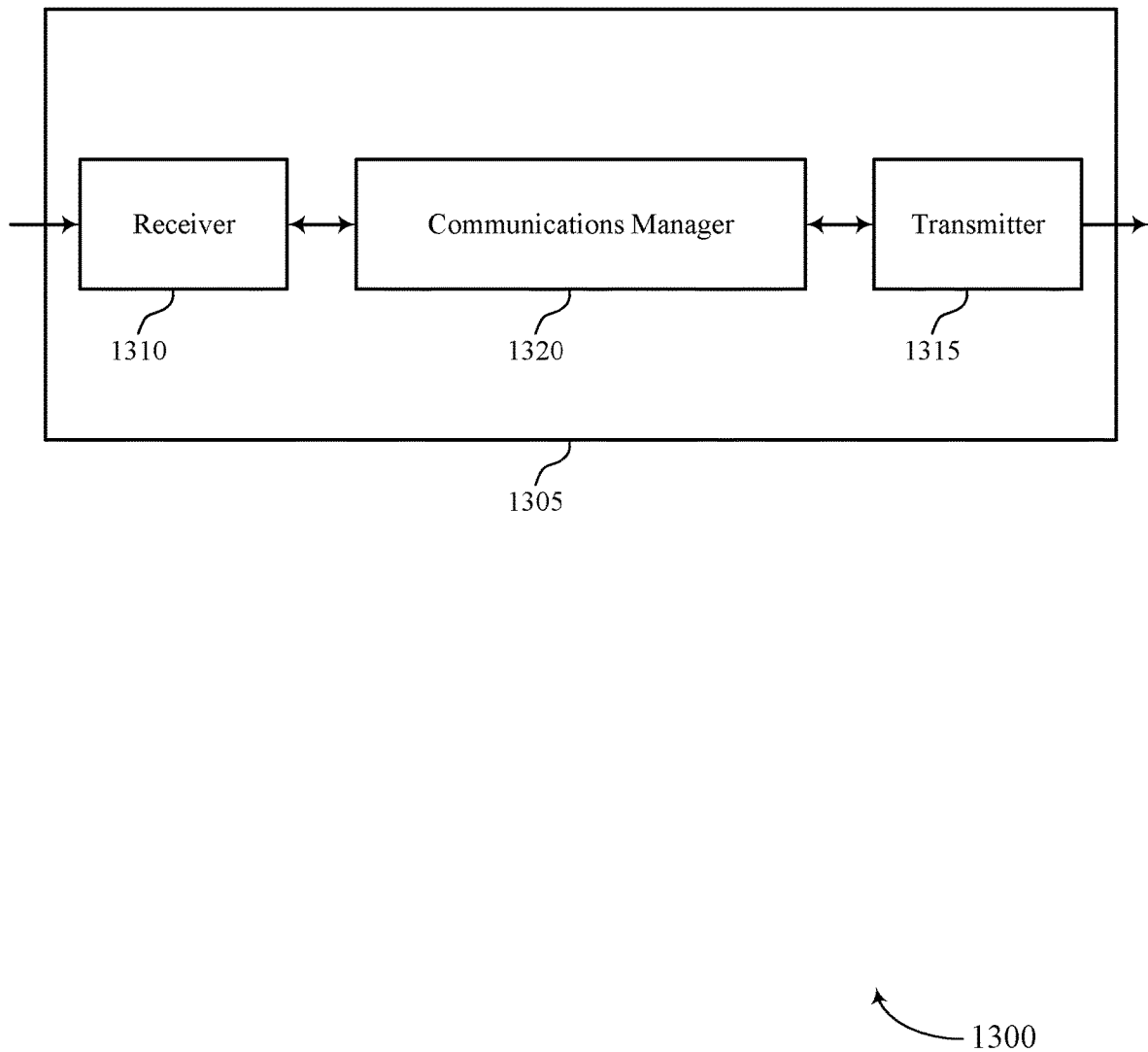
FIGS. 13 and 14 illustrate block diagrams of devices that support multi-user channel prediction for mobility scenarios in accordance with one or more aspects of the present disclosure.

FIG. 13 illustrates a block diagram 1300 of a device 1305 that supports multi-user channel prediction for mobility scenarios in accordance with one or more aspects of the present disclosure. The device 1305 may be an example of aspects of a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to multi-user channel prediction for mobility scenarios). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to multi-user channel prediction for mobility scenarios). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of multi-user channel prediction for mobility scenarios as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. For example, the communications manager 1320 may be configured as or otherwise support a means for receiving, via a first time slot, a first DMRS that is precoded according to a first set of precoding parameters. The communications manager 1320 may be configured as or otherwise support a means for receiving, via the first time slot, a second DMRS that is precoded according to a second set of precoding parameters. The communications manager 1320 may be configured as or otherwise support a means for transmitting a feedback message indicating channel estimation information for the UE based on the first DMRS and the second DMRS. The communications manager 1320 may be configured as or otherwise support a means for receiving, via a second time slot subsequent to the first time slot, one or more messages that are precoded according to a third set of precoding parameters, the third set of precoding parameters predicted based on the channel estimation information and a channel prediction procedure of a network entity.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced processing, reduced power consumption, and more efficient utilization of communication resources.

Figure 14:
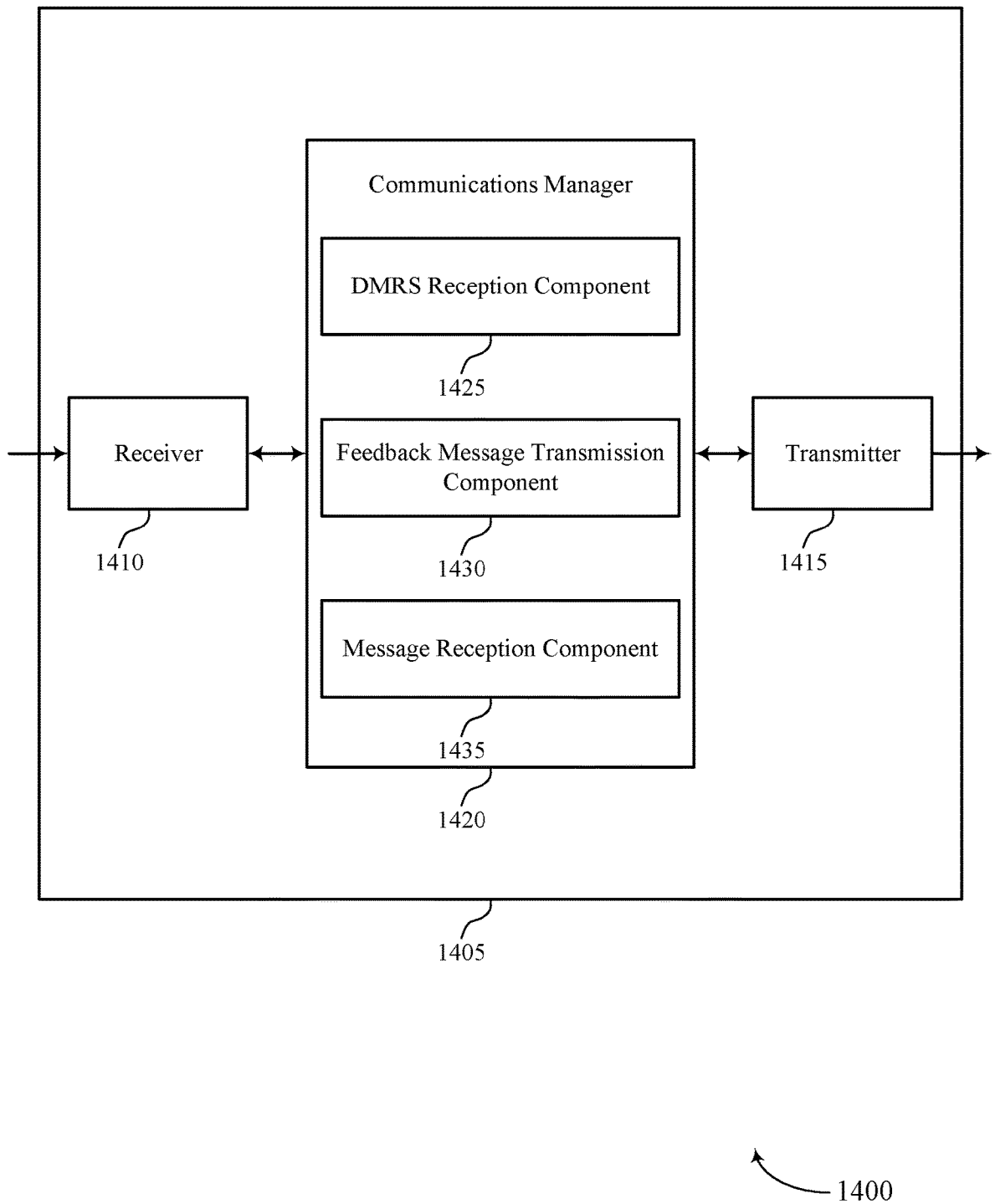

FIG. 14 illustrates a block diagram 1400 of a device 1405 that supports multi-user channel prediction for mobility scenarios in accordance with one or more aspects of the present disclosure. The device 1405 may be an example of aspects of a device 1305 or a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to multi-user channel prediction for mobility scenarios). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to multi-user channel prediction for mobility scenarios). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of multi-user channel prediction for mobility scenarios as described herein. For example, the communications manager 1420 may include a DMRS reception component 1425, a feedback message transmission component 1430, a message reception component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications in accordance with examples as disclosed herein. The DMRS reception component 1425 may be configured as or otherwise support a means for receiving, via a first time slot, a first DMRS that is precoded according to a first set of precoding parameters. The DMRS reception component 1425 may be configured as or otherwise support a means for receiving, via the first time slot, a second DMRS that is precoded according to a second set of precoding parameters. The feedback message transmission component 1430 may be configured as or otherwise support a means for transmitting a feedback message indicating channel estimation information for the UE based on the first DMRS and the second DMRS. The message reception component 1435 may be configured as or otherwise support a means for receiving, via a second time slot subsequent to the first time slot, one or more messages that are precoded according to a third set of precoding parameters, the third set of precoding parameters predicted based on the channel estimation information and a channel prediction procedure of a network entity.

Figure 15:
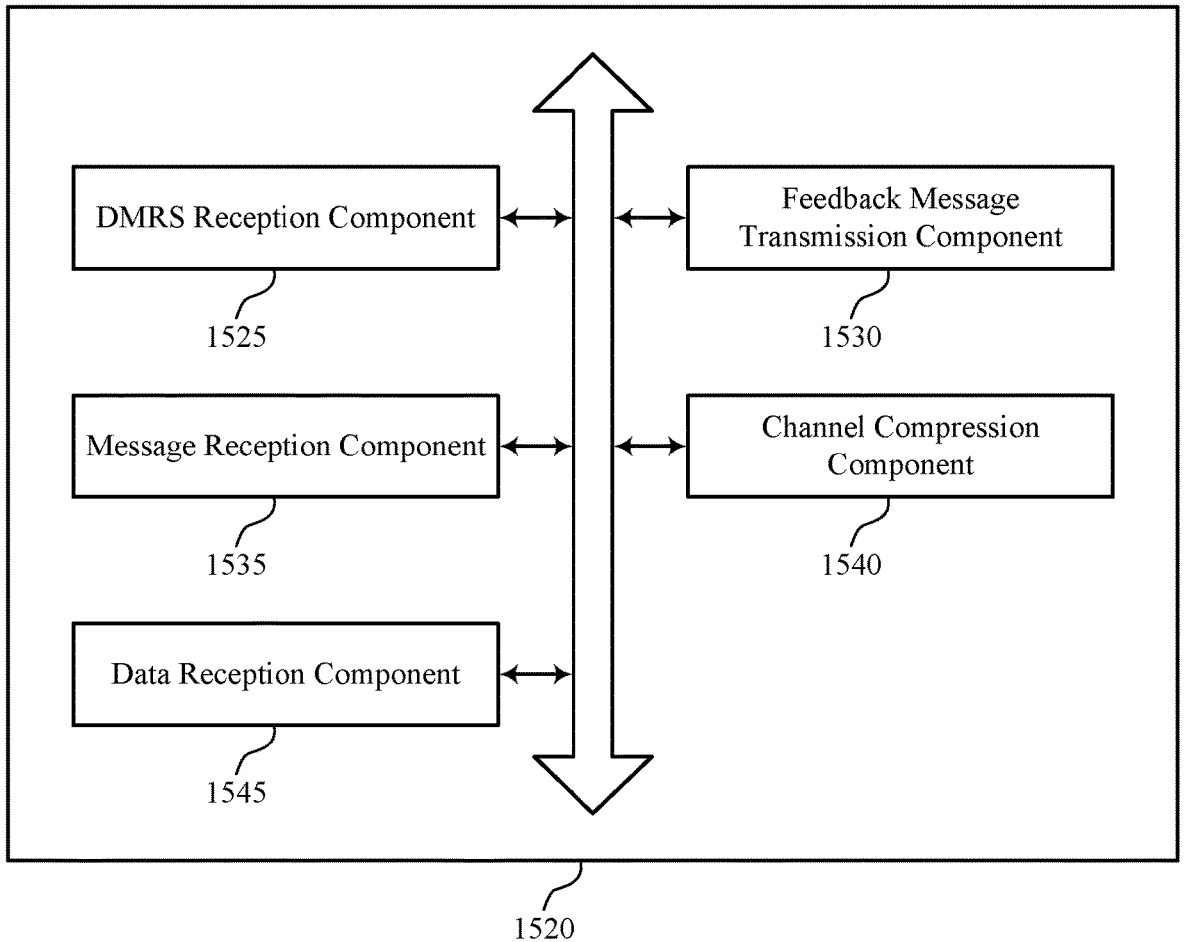
FIG. 15 illustrates a block diagram of a communications manager that supports multi-user channel prediction for mobility scenarios in accordance with one or more aspects of the present disclosure.

FIG. 15 illustrates a block diagram 1500 of a communications manager 1520 that supports multi-user channel prediction for mobility scenarios in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of multi-user channel prediction for mobility scenarios as described herein. For example, the communications manager 1520 may include a DMRS reception component 1525, a feedback message transmission component 1530, a message reception component 1535, a channel compression component 1540, a data reception component 1545, or any combination thereof. Each of these components may communicate, directly or indirectly, with one another (e.g., via one or more buses).

The communications manager 1520 may support wireless communications in accordance with examples as disclosed herein. The DMRS reception component 1525 may be configured as or otherwise support a means for receiving, via a first time slot, a first DMRS that is precoded according to a first set of precoding parameters. In some examples, the DMRS reception component 1525 may be configured as or otherwise support a means for receiving, via the first time slot, a second DMRS that is precoded according to a second set of precoding parameters. The feedback message transmission component 1530 may be configured as or otherwise support a means for transmitting a feedback message indicating channel estimation information for the UE based on the first DMRS and the second DMRS. The message reception component 1535 may be configured as or otherwise support a means for receiving, via a second time slot subsequent to the first time slot, one or more messages that are precoded according to a third set of precoding parameters, the third set of precoding parameters predicted based on the channel estimation information and a channel prediction procedure of a network entity.

In some examples, the DMRS reception component 1525 may be configured as or otherwise support a means for receiving, via the first time slot, one or more demodulated reference signals associated with one or more second UEs, where the channel estimation information is based on the one or more demodulated reference signals associated with the one or more second UEs.

In some examples, the channel compression component 1540 may be configured as or otherwise support a means for measuring a frequency domain response of a channel associated with receiving the first DMRS and the second DMRS. In some examples, the channel compression component 1540 may be configured as or otherwise support a means for generating a time domain response based on the frequency domain response of the channel.

In some examples, the channel compression component 1540 may be configured as or otherwise support a means for generating a spatial model based on the time domain response or the frequency domain response of the channel, where the feedback message includes a two dimensional time and space domain response of the channel based on the time domain response and the spatial model.

In some examples, to support transmitting the feedback message, the feedback message transmission component 1530 may be configured as or otherwise support a means for transmitting, in the first time slot, the feedback message indicating the channel estimation information including a set of differential channel coefficients associated with a coding parameter, where each differential channel coefficient of the set of differential channel coefficients includes a channel coefficient difference relative to a respective channel coefficient of a set of channel coefficients associated with one or more slots prior to the first time slot.

In some examples, the feedback message transmission component 1530 may be configured as or otherwise support a means for transmitting the feedback message via a PUCCH or a PUSCH.

In some examples, the feedback message transmission component 1530 may be configured as or otherwise support a means for transmitting the feedback message using a first set of frequency resources. In some examples, the data reception component 1545 may be configured as or otherwise support a means for receiving data using a second set of frequency resources different from the first set of frequency resources, where transmitting the feedback message and receiving the data occurs concurrently via a full-duplex mode of the UE.

In some examples, the message reception component 1535 may be configured as or otherwise support a means for receiving a control message indicating a set of information for processing the first DMRS and the second DMRS.

In some examples, the first set of precoding parameters is different from the second set of precoding parameters associated with the second DMRS.

In some examples, the channel estimation information includes a set of coefficients associated with a precoded channel response.

Figure 16:
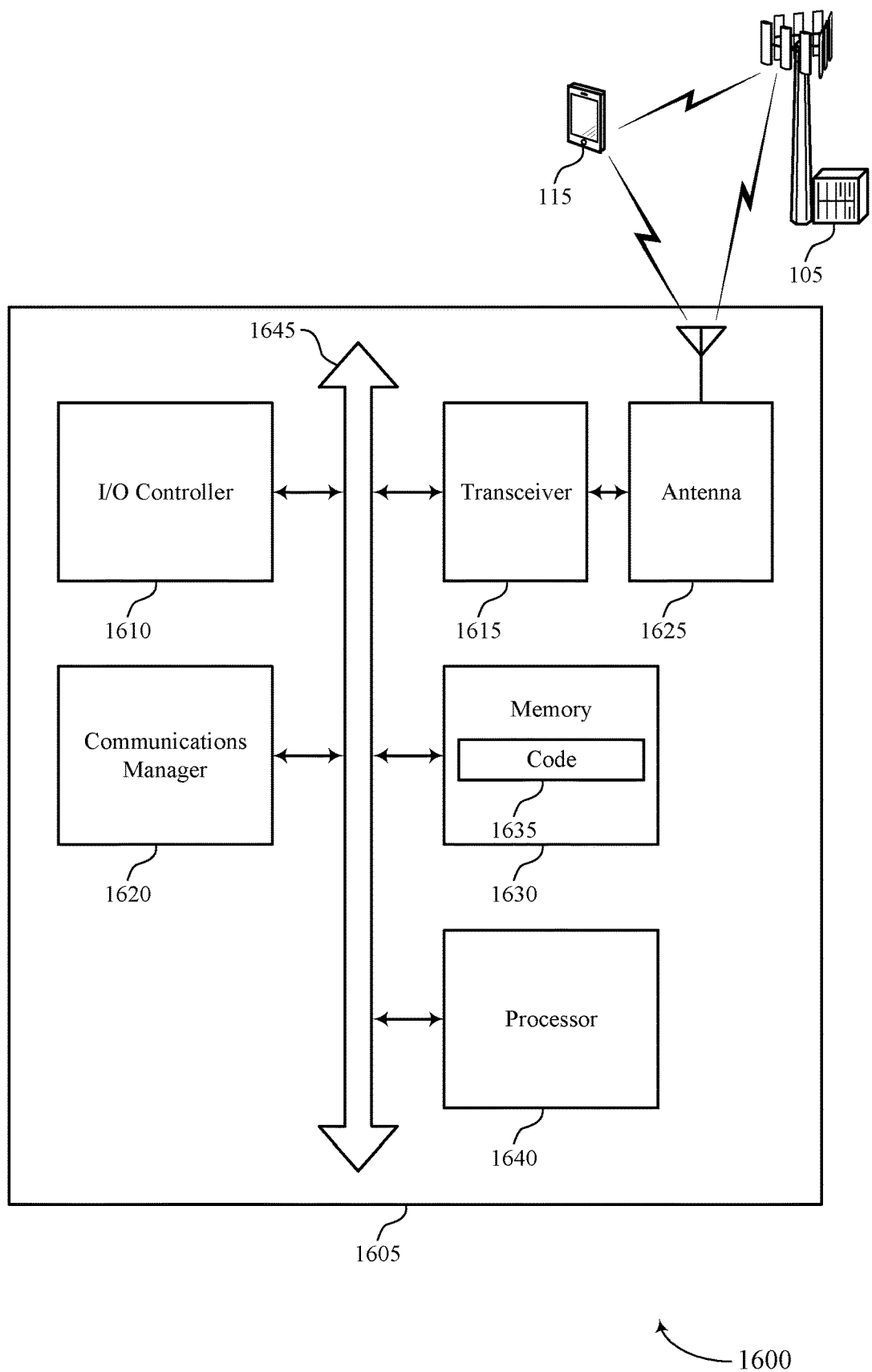
FIG. 16 illustrates a diagram of a system including a device that supports multi-user channel prediction for mobility scenarios in accordance with one or more aspects of the present disclosure.

FIG. 16 illustrates a diagram of a system 1600 including a device 1605 that supports multi-user channel prediction for mobility scenarios in accordance with one or more aspects of the present disclosure. The device 1605 may be an example of or include the components of a device 1305, a device 1405, or a UE 115 as described herein. The device 1605 may communicate (e.g., wirelessly) with one or more network entities 105, one or more UEs 115, or any combination thereof. The device 1605 may include components for bi-directional voice and data communications including components for transmitting and receiving communications, such as a communications manager 1620, an input/output (I/O) controller 1610, a transceiver 1615, an antenna 1625, a memory 1630, code 1635, and a processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally or alternatively, the I/O controller 1610 may represent or interact with a modem, a keyboard, a mouse, a touchscreen, or a similar device. In some cases, the I/O controller 1610 may be implemented as part of a processor, such as the processor 1640. In some cases, a user may interact with the device 1605 via the I/O controller 1610 or via hardware components controlled by the I/O controller 1610.

In some cases, the device 1605 may include a single antenna 1625. However, in some other cases, the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include random access memory (RAM) and read-only memory (ROM). The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a basic I/O system (BIOS) which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting multi-user channel prediction for mobility scenarios). For example, the device 1605 or a component of the device 1605 may include a processor 1640 and memory 1630 coupled with or to the processor 1640, the processor 1640 and memory 1630 configured to perform various functions described herein.

The communications manager 1620 may support wireless communications in accordance with examples as disclosed herein. For example, the communications manager 1620 may be configured as or otherwise support a means for receiving, via a first time slot, a first DMRS that is precoded according to a first set of precoding parameters. The communications manager 1620 may be configured as or otherwise support a means for receiving, via the first time slot, a second DMRS that is precoded according to a second set of precoding parameters. The communications manager 1620 may be configured as or otherwise support a means for transmitting a feedback message indicating channel estimation information for the UE based on the first DMRS and the second DMRS. The communications manager 1620 may be configured as or otherwise support a means for receiving, via a second time slot subsequent to the first time slot, one or more messages that are precoded according to a third set of precoding parameters, the third set of precoding parameters predicted based on the channel estimation information and a channel prediction procedure of a network entity.

By including or configuring the communications manager 1620 in accordance with examples as described herein, the device 1605 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of multi-user channel prediction for mobility scenarios as described herein, or the processor 1640 and the memory 1630 may be otherwise configured to perform or support such operations.

Figure 17:
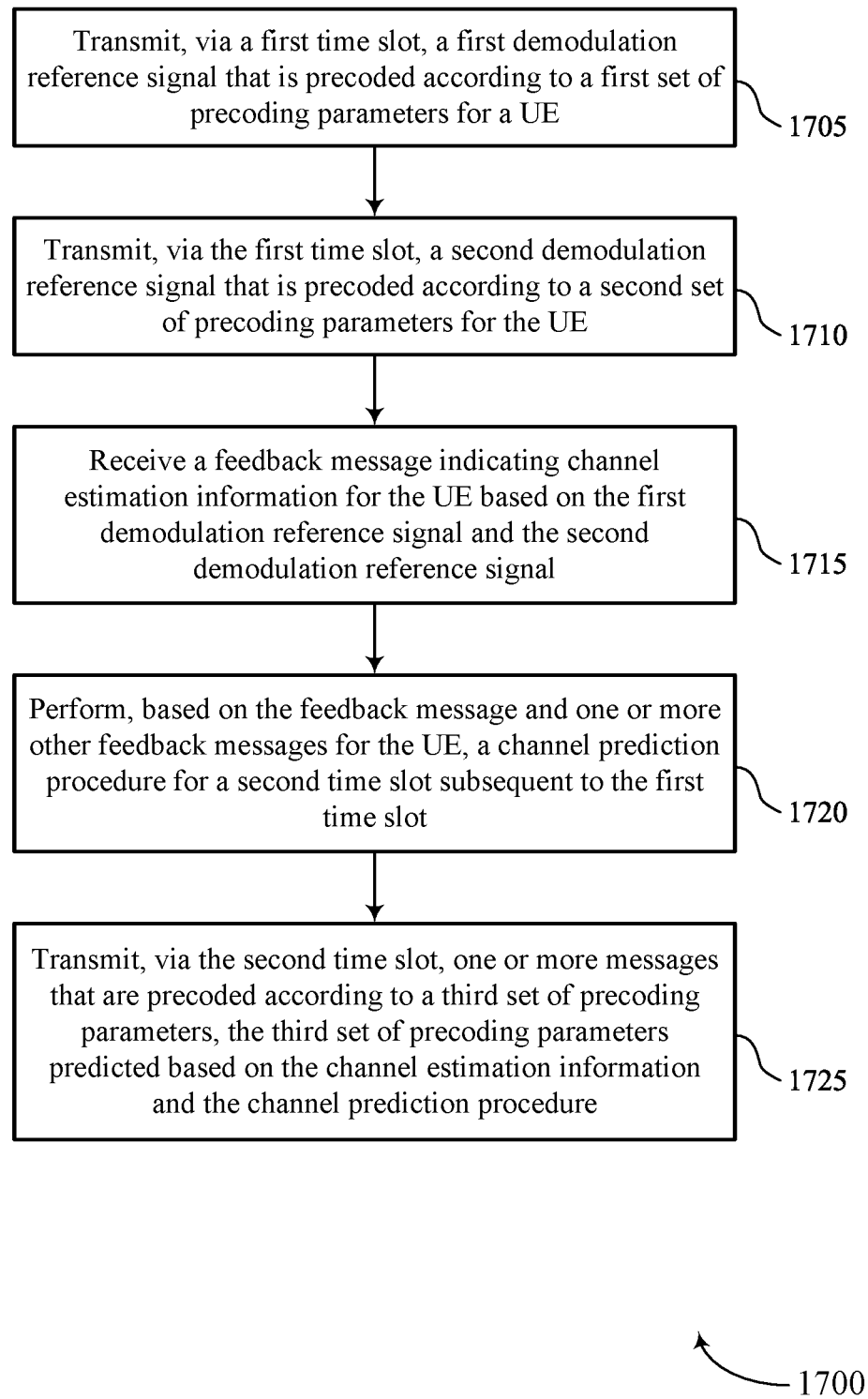
FIGS. 17 through 20 illustrate flowcharts showing methods that support multi-user channel prediction for mobility scenarios in accordance with one or more aspects of the present disclosure.

FIG. 17 illustrates a flowchart showing a method 1700 that supports multi-user channel prediction for mobility scenarios in accordance with one or more aspects of the present disclosure. The operations of the method 1700 may be implemented by a network entity or its components as described herein. For example, the operations of the method 1700 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, via a first time slot, a first DMRS that is precoded according to a first set of precoding parameters for a UE. The operations of 1705 may be performed in accordance with examples as disclosed herein. In some examples, aspects of the operations of 1705 may be performed by a DMRS transmission component 1125 as described with reference to FIG. 11.

At 1710, the method may include transmitting, via the first time slot, a second DMRS that is precoded according to a second set of precoding parameters for the UE. The operations of 1710 may be performed in accordance with examples as disclosed herein. In some examples, aspects of the operations of 1710 may be performed by a DMRS transmission component 1125 as described with reference to FIG. 11.

At 1715, the method may include receiving a feedback message indicating channel estimation information for the UE based on the first DMRS and the second DMRS. The operations of 1715 may be performed in accordance with examples as disclosed herein. In some examples, aspects of the operations of 1715 may be performed by a feedback reception component 1130 as described with reference to FIG. 11.

At 1720, the method may include performing, based on the feedback message and one or more other feedback messages for the UE, a channel prediction procedure for a second time slot subsequent to the first time slot. The operations of 1720 may be performed in accordance with examples as disclosed herein. In some examples, aspects of the operations of 1720 may be performed by a channel prediction component 1135 as described with reference to FIG. 11.

At 1725, the method may include transmitting, via the second time slot, one or more messages that are precoded according to a third set of precoding parameters, the third set of precoding parameters predicted based on the channel estimation information and the channel prediction procedure. The operations of 1725 may be performed in accordance with examples as disclosed herein. In some examples, aspects of the operations of 1725 may be performed by a message transmission component 1140 as described with reference to FIG. 11.

Figure 18:
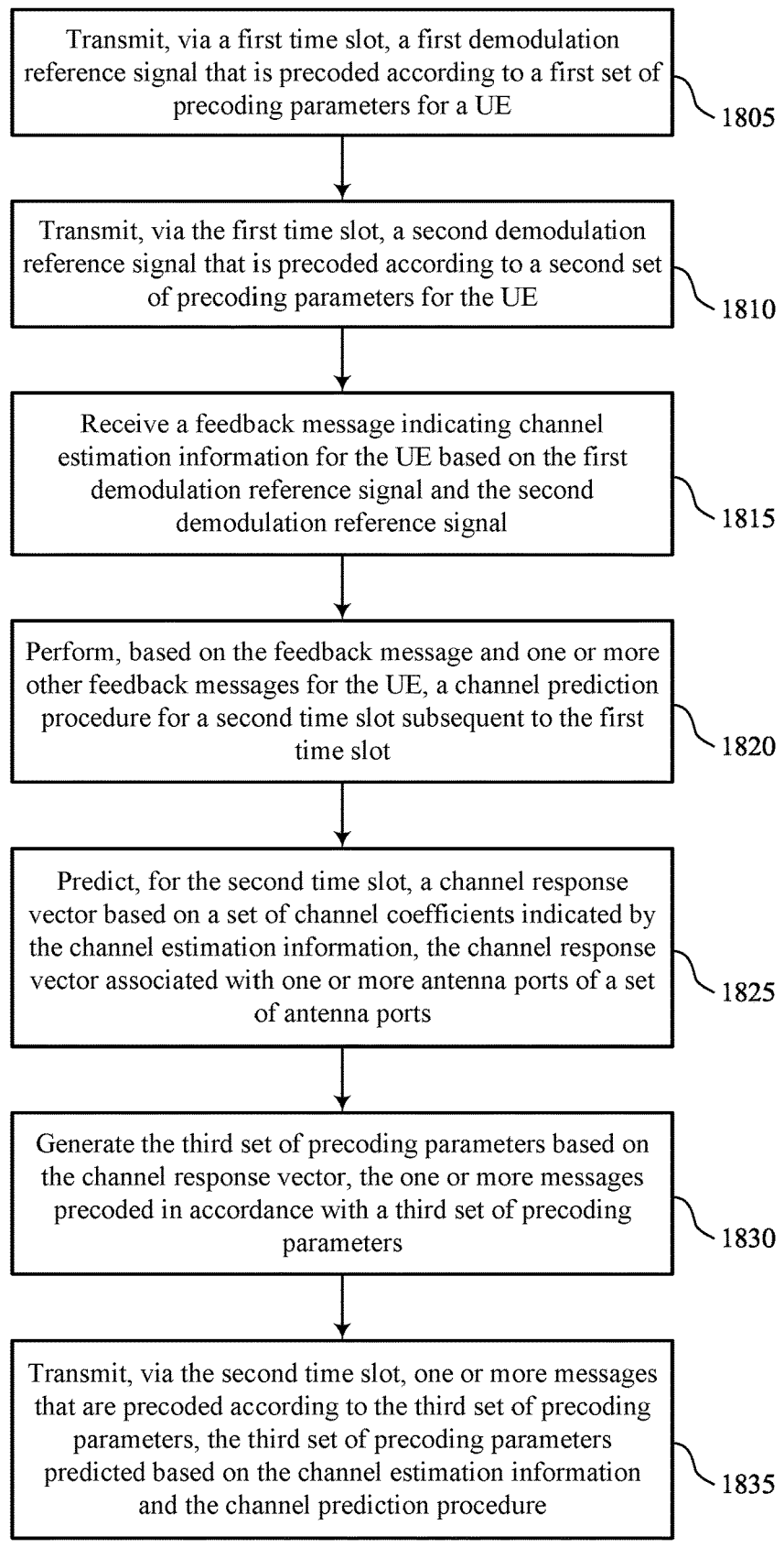

FIG. 18 illustrates a flowchart showing a method 1800 that supports multi-user channel prediction for mobility scenarios in accordance with one or more aspects of the present disclosure. The operations of the method 1800 may be implemented by a network entity or its components as described herein. For example, the operations of the method 1800 may be performed by a network entity as described with reference to FIGS. 1 through 12. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, via a first time slot, a first DMRS that is precoded according to a first set of precoding parameters for a UE. The operations of 1805 may be performed in accordance with examples as disclosed herein. In some examples, aspects of the operations of 1805 may be performed by a DMRS transmission component 1125 as described with reference to FIG. 11.

At 1810, the method may include transmitting, via the first time slot, a second DMRS that is precoded according to a second set of precoding parameters for the UE. The operations of 1810 may be performed in accordance with examples as disclosed herein. In some examples, aspects of the operations of 1810 may be performed by a DMRS transmission component 1125 as described with reference to FIG. 11.

At 1815, the method may include receiving a feedback message indicating channel estimation information for the UE based on the first DMRS and the second DMRS. The operations of 1815 may be performed in accordance with examples as disclosed herein. In some examples, aspects of the operations of 1815 may be performed by a feedback reception component 1130 as described with reference to FIG. 11.

At 1820, the method may include performing, based on the feedback message and one or more other feedback messages for the UE, a channel prediction procedure for a second time slot subsequent to the first time slot. The operations of 1820 may be performed in accordance with examples as disclosed herein. In some examples, aspects of the operations of 1820 may be performed by a channel prediction component 1135 as described with reference to FIG. 11.

At 1825, the method may include predicting, for the second time slot, a channel response vector based on a set of channel coefficients indicated by the channel estimation information, the channel response vector associated with one or more antenna ports of a set of antenna ports. The operations of 1825 may be performed in accordance with examples as disclosed herein. In some examples, aspects of the operations of 1825 may be performed by a channel prediction component 1135 as described with reference to FIG. 11.

At 1830, the method may include generating the third set of precoding parameters based on the channel response vector, the one or more messages precoded in accordance with the third set of precoding parameters. The operations of 1830 may be performed in accordance with examples as disclosed herein. In some examples, aspects of the operations of 1830 may be performed by a precoding parameter generation component 1145 as described with reference to FIG. 11.

At 1835, the method may include transmitting, via the second time slot, one or more messages that are precoded according to a third set of precoding parameters, the third set of precoding parameters predicted based on the channel estimation information and the channel prediction procedure. The operations of 1835 may be performed in accordance with examples as disclosed herein. In some examples, aspects of the operations of 1835 may be performed by a message transmission component 1140 as described with reference to FIG. 11.

Figure 19:
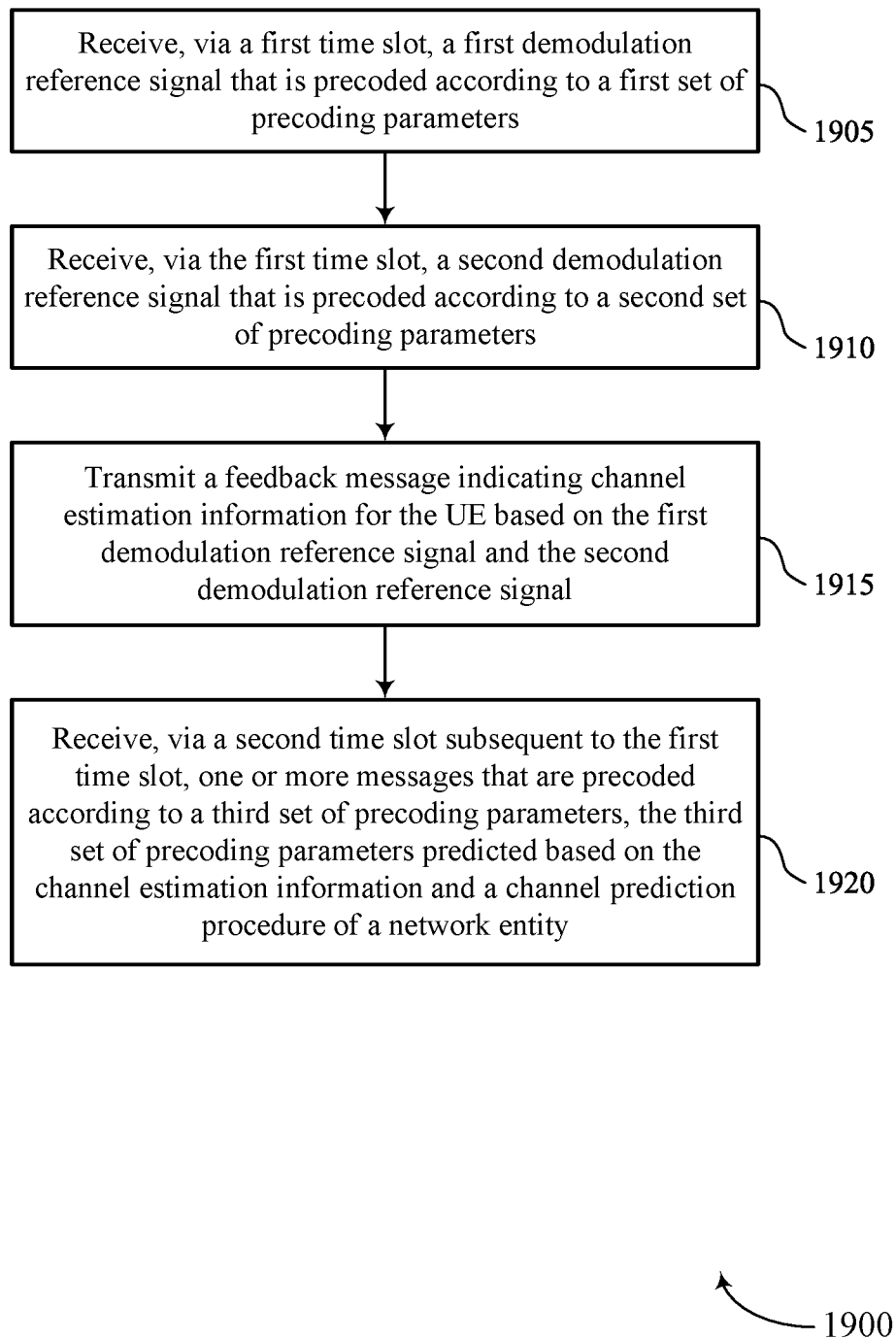

FIG. 19 illustrates a flowchart showing a method 1900 that supports multi-user channel prediction for mobility scenarios in accordance with one or more aspects of the present disclosure. The operations of the method 1900 may be implemented by a UE or its components as described herein. For example, the operations of the method 1900 may be performed by a UE 115 as described with reference to FIGS. 1 through 8 and 13 through 16. In some examples, a UE may execute a set of instructions to control the functional elements of the UE to perform the described functions. Additionally, or alternatively, the UE may perform aspects of the described functions using special-purpose hardware.

At 1905, the method may include receiving, via a first time slot, a first DMRS that is precoded according to a first set of precoding parameters. The operations of 1905 may be performed in accordance with examples as disclosed herein. In some examples, aspects of the operations of 1905 may be performed by a DMRS reception component 1525 as described with reference to FIG. 15.

At 1910, the method may include receiving, via the first time slot, a second DMRS that is precoded according to a second set of precoding parameters. The operations of 1910 may be performed in accordance with examples as disclosed herein. In some examples, aspects of the operations of 1910 may be performed by a DMRS reception component 1525 as described with reference to FIG. 15.

At 1915, the method may include transmitting a feedback message indicating channel estimation information for the UE based on the first DMRS and the second DMRS. The operations of 1915 may be performed in accordance with examples as disclosed herein. In some examples, aspects of the operations of 1915 may be performed by a feedback message transmission component 1530 as described with reference to FIG. 15.

At 1920, the method may include receiving, via a second time slot subsequent to the first time slot, one or more messages that are precoded according to a third set of precoding parameters, the third set of precoding parameters predicted based on the channel estimation information and a channel prediction procedure of a network entity. The operations of 1920 may be performed in accordance with examples as disclosed herein. In some examples, aspects of the operations of 1920 may be performed by a message reception component 1535 as described with reference to FIG. 15.

Figure 20:
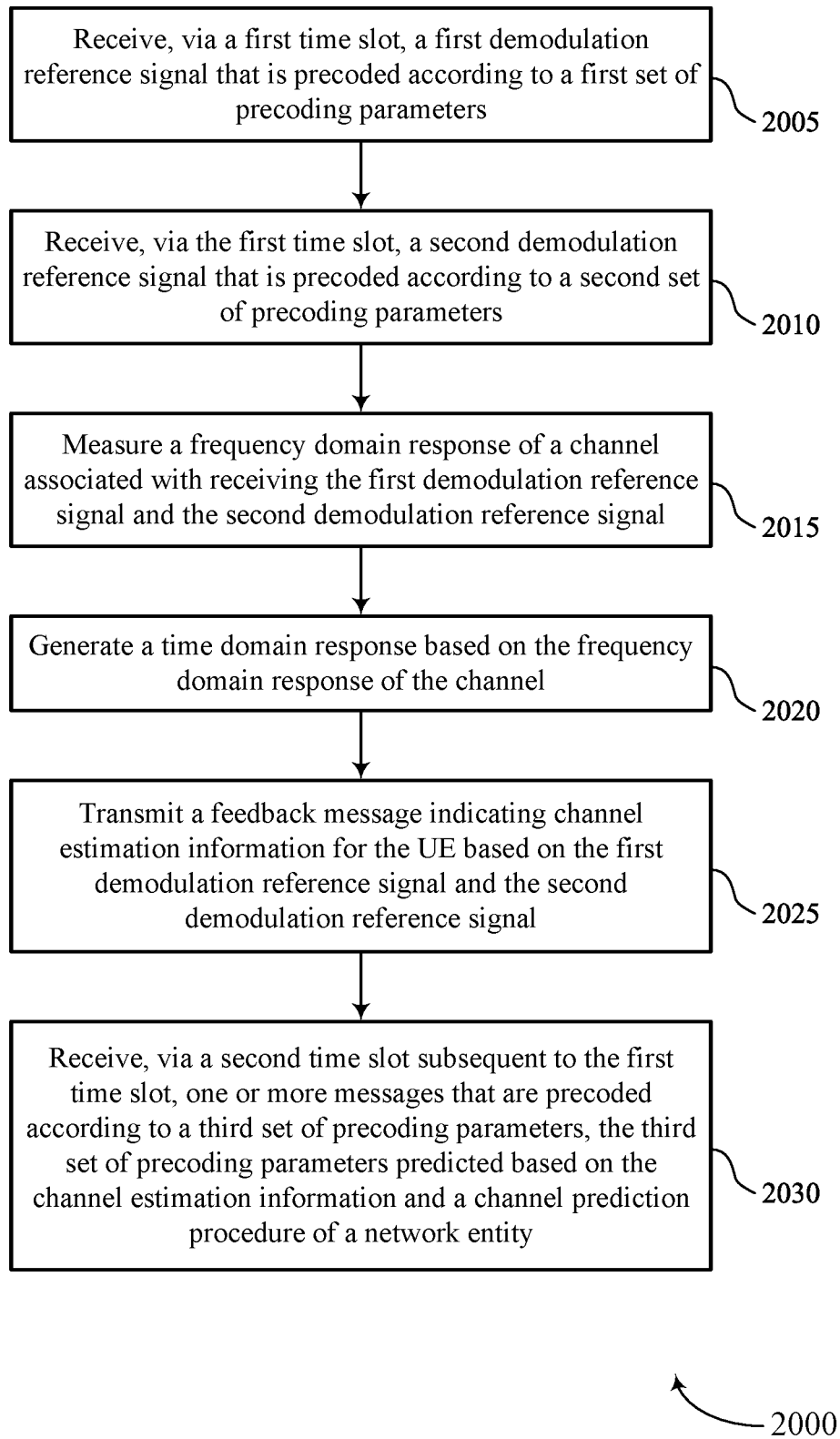

FIG. 20 illustrates a flowchart showing a method 2000 that supports multi-user channel prediction for mobility scenarios in accordance with one or more aspects of the present disclosure. The operations of the method 2000 may be implemented by a UE or its components as described herein. For example, the operations of the method 2000 may be performed by a UE 115 as described with reference to FIGS. 1 through 8 and 13 through 16. In some examples, a UE may execute a set of instructions to control the functional elements of the UE to perform the described functions. Additionally, or alternatively, the UE may perform aspects of the described functions using special-purpose hardware.

At 2005, the method may include receiving, via a first time slot, a first DMRS that is precoded according to a first set of precoding parameters. The operations of 2005 may be performed in accordance with examples as disclosed herein. In some examples, aspects of the operations of 2005 may be performed by a DMRS reception component 1525 as described with reference to FIG. 15.

At 2010, the method may include receiving, via the first time slot, a second DMRS that is precoded according to a second set of precoding parameters. The operations of 2010 may be performed in accordance with examples as disclosed herein. In some examples, aspects of the operations of 2010 may be performed by a DMRS reception component 1525 as described with reference to FIG. 15.

At 2015, the method may include measuring a frequency domain response of a channel associated with receiving the first DMRS and the second DMRS. The operations of 2015 may be performed in accordance with examples as disclosed herein. In some examples, aspects of the operations of 2015 may be performed by a channel compression component 1540 as described with reference to FIG. 15.

At 2020, the method may include generating a time domain response based on the frequency domain response of the channel. The operations of 2020 may be performed in accordance with examples as disclosed herein. In some examples, aspects of the operations of 2020 may be performed by a channel compression component 1540 as described with reference to FIG. 15.

At 2025, the method may include transmitting a feedback message indicating channel estimation information for the UE based on the first DMRS and the second DMRS. The operations of 2025 may be performed in accordance with examples as disclosed herein. In some examples, aspects of the operations of 2025 may be performed by a feedback message transmission component 1530 as described with reference to FIG. 15.

At 2030, the method may include receiving, via a second time slot subsequent to the first time slot, one or more messages that are precoded according to a third set of precoding parameters, the third set of precoding parameters predicted based on the channel estimation information and a channel prediction procedure of a network entity. The operations of 2030 may be performed in accordance with examples as disclosed herein. In some examples, aspects of the operations of 2030 may be performed by a message reception component 1535 as described with reference to FIG. 15.

The following provides an overview of aspects of the present disclosure:

Aspect 1: A method for wireless communications, at a network entity, comprising: transmitting, via a first time slot, a first DMRS that is precoded according to a first set of precoding parameters for a UE; transmitting, via the first time slot, a second DMRS that is precoded according to a second set of precoding parameters for the UE; receiving a feedback message indicating channel estimation information for the UE based at least in part on the first DMRS and the second DMRS; performing, based at least in part on the feedback message and one or more other feedback messages for the UE, a channel prediction procedure for a second time slot subsequent to the first time slot; and transmitting, via the second time slot, one or more messages that are precoded according to a third set of precoding parameters, the third set of precoding parameters predicted based at least in part on the channel estimation information and the channel prediction procedure.

Aspect 2: The method of aspect 1, wherein performing the channel prediction procedure comprises: predicting, for the second time slot, a channel response vector based at least in part on a set of channel coefficients indicated by the channel estimation information, the channel response vector associated with one or more antenna ports of a set of antenna ports; and generating the third set of precoding parameters based at least in part on the channel response vector, the one or more messages precoded in accordance with the third set of precoding parameters.

Aspect 3: The method of aspect 2, wherein predicting the channel response vector comprises: combining one or more previous channel estimation information associated with the one or more antenna ports of the set of antenna ports, the one or more previous channel estimation information associated with the one or more other feedback messages.

Aspect 4: The method of any of aspects 1 through 3, further comprising: receiving, prior to receiving the feedback message, the one or more other feedback messages, wherein the feedback message and each feedback message of the one or more other feedback messages is associated with a respective time slot prior to the first time slot.

Aspect 5: The method of aspect 4, wherein transmitting the one or more messages comprises: transmitting, via the second time slot, the one or more messages based at least in part on receiving the one or more other feedback messages.

Aspect 6: The method of any of aspects 1 through 5, further comprising: transmitting a control message indicating a set of information for processing the first DMRS for decoding at the UE and processing the second DMRS.

Aspect 7: The method of any of aspects 1 through 6, wherein the first set of precoding parameters is different from the second set of precoding parameters associated with the second DMRS.

Aspect 8: The method of any of aspects 1 through 7, further comprising: transmitting, via the first time slot, a first set of DMRSs precoded according to the first set of precoding parameters, wherein each DMRS of the first set of DMRSs is associated with a respective UE of a set of UEs that includes the UE; transmitting, via the first time slot, a second set of DMRSs precoded according to the second set of precoding parameters, wherein each DMRS of the second set of DMRSs is associated with a respective UE of the set of UEs; and receiving, from the set of UEs, respective feedback messages indicating respective channel estimation information based at least in part on the first set of DMRSs and the second set of DMRSs.

Aspect 9: The method of aspect 8, further comprising: generating a MU-MIMO channel prediction based at least in part on the respective feedback messages; and generating a MU-MIMO channel precoder associated with the set of UEs based at least in part on the MU-MIMO channel prediction.

Aspect 10: The method of any of aspects 1 through 9, wherein the channel estimation information comprises a set of coefficients associated with a precoded channel response.

Aspect 11: A method for wireless communications, at a UE comprising: receiving, via a first time slot, a first DMRS that is precoded according to a first set of precoding parameters; receiving, via the first time slot, a second DMRS that is precoded according to a second set of precoding parameters; transmitting a feedback message indicating channel estimation information for the UE based at least in part on the first DMRS and the second DMRS; and receiving, via a second time slot subsequent to the first time slot, one or more messages that are precoded according to a third set of precoding parameters, the third set of precoding parameters predicted based at least in part on the channel estimation information and a channel prediction procedure of a network entity.

Aspect 12: The method of aspect 11, further comprising: receiving, via the first time slot, one or more demodulated reference signals associated with one or more second UEs, wherein the channel estimation information is based at least in part on the one or more demodulated reference signals associated with the one or more second UEs.

Aspect 13: The method of any of aspects 11 through 12, further comprising: measuring a frequency domain response of a channel associated with receiving the first DMRS and the second DMRS; and generating a time domain response based at least in part on the frequency domain response of the channel.

Aspect 14: The method of aspect 13, further comprising: generating a spatial model based at least in part on the time domain response or the frequency domain response of the channel, wherein the feedback message comprises a two dimensional time and space domain response of the channel based at least in part on the time domain response and the spatial model.

Aspect 15: The method of any of aspects 11 through 14, wherein transmitting the feedback message comprises: transmitting, in the first time slot, the feedback message indicating the channel estimation information comprising a set of differential channel coefficients associated with a coding parameter, wherein each differential channel coefficient of the set of differential channel coefficients comprises a channel coefficient difference relative to a respective channel coefficient of a set of channel coefficients associated with one or more slots prior to the first time slot.

Aspect 16: The method of any of aspects 11 through 15, further comprising: transmitting the feedback message via a PUCCH or a PUSCH.

Aspect 17: The method of any of aspects 11 through 16, further comprising: transmitting the feedback message using a first set of frequency resources; and receiving data using a second set of frequency resources different from the first set of frequency resources, wherein transmitting the feedback message and receiving the data occurs concurrently via a full-duplex mode of the UE.

Aspect 18: The method of any of aspects 11 through 17, further comprising: receiving a control message indicating a set of information for processing the first DMRS and the second DMRS.

Aspect 19: The method of any of aspects 11 through 18, wherein the first set of precoding parameters is different from the second set of precoding parameters associated with the second DMRS.

Aspect 20: The method of any of aspects 11 through 19, wherein the channel estimation information comprises a set of coefficients associated with a precoded channel response.

Aspect 21: An apparatus for wireless communications, comprising a processor; memory coupled with the processor; and instructions stored in the memory and executable by the processor to cause the apparatus to perform a method of any of aspects 1 through 10.

Aspect 22: An apparatus for wireless communications, comprising at least one means for performing a method of any of aspects 1 through 10.

Aspect 23: A non-transitory computer-readable medium storing code for wireless communications, the code comprising instructions executable by a processor to perform a method of any of aspects 1 through 10.

Aspect 24: An apparatus for wireless communications, comprising a processor; memory coupled with the processor; and instructions stored in the memory and executable by the processor to cause the apparatus to perform a method of any of aspects 11 through 20.

Aspect 25: An apparatus for wireless communications, comprising at least one means for performing a method of any of aspects 11 through 20.

Aspect 26: A non-transitory computer-readable medium storing code for wireless communications, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:
   a processor;
   memory coupled with the processor; and
   instructions stored in the memory and executable by the processor to cause the apparatus to:
      transmit, via a first time slot, a first demodulation reference signal that is precoded according to a first set of precoding parameters for a user equipment (UE);
      transmit, via the first time slot, a second demodulation reference signal that is precoded according to a second set of precoding parameters for the UE;
      receive a feedback message indicating channel estimation information for the UE based at least in part on the first demodulation reference signal and the second demodulation reference signal;
      perform, based at least in part on the feedback message and one or more other feedback messages for the UE, a channel prediction procedure for a second time slot subsequent to the first time slot; and
      transmit, via the second time slot, one or more messages that are precoded according to a third set of precoding parameters, the third set of precoding parameters predicted based at least in part on the channel estimation information and the channel prediction procedure.

2. The apparatus of claim 1, wherein the instructions to perform the channel prediction procedure are executable by the processor to cause the apparatus to:
   predict, for the second time slot, a channel response vector based at least in part on a set of channel coefficients indicated by the channel estimation information, the channel response vector associated with one or more antenna ports of a set of antenna ports; and
   generate the third set of precoding parameters based at least in part on the channel response vector, the one or more messages precoded in accordance with the third set of precoding parameters.

3. The apparatus of claim 2, wherein the instructions to predict the channel response vector are executable by the processor to cause the apparatus to:
   combine one or more previous channel estimation information associated with the one or more antenna ports of the set of antenna ports, the one or more previous channel estimation information associated with the one or more other feedback messages.

4. The apparatus of claim 1, wherein the instructions are further executable by the processor to cause the apparatus to:
   receive, prior to receiving the feedback message, the one or more other feedback messages, wherein the feedback message and each feedback message of the one or more other feedback messages is associated with a respective time slot prior to the first time slot.

5. The apparatus of claim 4, wherein the instructions to transmit the one or more messages are executable by the processor to cause the apparatus to:
   transmit, via the second time slot, the one or more messages based at least in part on receiving the one or more other feedback messages.

6. The apparatus of claim 1, wherein the instructions are further executable by the processor to cause the apparatus to:
   transmit a control message indicating a set of information for processing the first demodulation reference signal for decoding at the UE and processing the second demodulation reference signal.

7. The apparatus of claim 1, wherein the first set of precoding parameters is different from the second set of precoding parameters associated with the second demodulation reference signal.

8. The apparatus of claim 1, wherein the instructions are further executable by the processor to cause the apparatus to:
   transmit, via the first time slot, a first set of demodulation reference signals precoded according to the first set of precoding parameters, wherein each demodulation reference signal of the first set of demodulation reference signals is associated with a respective UE of a set of UEs that includes the apparatus;
   transmit, via the first time slot, a second set of demodulation reference signals precoded according to the second set of precoding parameters, wherein each demodulation reference signal of the second set of demodulation reference signals is associated with a respective UE of the set of UEs; and
   receive, from the set of UEs, respective feedback messages indicating respective channel estimation information based at least in part on the first set of demodulation reference signals and the second set of demodulation reference signals.

9. The apparatus of claim 8, wherein the instructions are further executable by the processor to cause the apparatus to:
   generate a multi-user multi-input and multi-output (MU-MIMO) channel prediction based at least in part on the respective feedback messages; and
   generate a MU-MIMO channel precoder associated with the set of UEs based at least in part on the MU-MIMO channel prediction.

10. The apparatus of claim 1, wherein the channel estimation information comprises a set of coefficients associated with a precoded channel response.

11. An apparatus for wireless communications, comprising:
   a processor;
   memory coupled with the processor; and
   instructions stored in the memory and executable by the processor to cause the apparatus to:
      receive, via a first time slot, a first demodulation reference signal that is precoded according to a first set of precoding parameters;
      receive, via the first time slot, a second demodulation reference signal that is precoded according to a second set of precoding parameters;
      transmit a feedback message indicating channel estimation information for the apparatus based at least in part on the first demodulation reference signal and the second demodulation reference signal; and
      receive, via a second time slot subsequent to the first time slot, one or more messages that are precoded according to a third set of precoding parameters, the third set of precoding parameters predicted based at least in part on the channel estimation information and a channel prediction procedure of a network entity.

12. The apparatus of claim 11, wherein the instructions are further executable by the processor to cause the apparatus to:

receive, via the first time slot, one or more demodulated reference signals associated with one or more second UEs, wherein the channel estimation information is based at least in part on the one or more demodulated reference signals associated with the one or more second UEs.

13. The apparatus of claim 11, wherein the instructions are further executable by the processor to cause the apparatus to:

measure a frequency domain response of a channel associated with receiving the first demodulation reference signal and the second demodulation reference signal; and generate a time domain response based at least in part on the frequency domain response of the channel.

14. The apparatus of claim 13, wherein the instructions are further executable by the processor to cause the apparatus to:

generate a spatial model based at least in part on the time domain response or the frequency domain response of the channel, wherein the feedback message comprises a two dimensional time and space domain response of the channel based at least in part on the time domain response and the spatial model.

15. The apparatus of claim 11, wherein the instructions to transmit the feedback message are executable by the processor to cause the apparatus to:

transmit, in the first time slot, the feedback message indicating the channel estimation information comprising a set of differential channel coefficients associated with a coding parameter, wherein each differential channel coefficient of the set of differential channel coefficients comprises a channel coefficient difference relative to a respective channel coefficient of a set of channel coefficients associated with one or more slots prior to the first time slot.

16. The apparatus of claim 11, wherein the instructions are further executable by the processor to cause the apparatus to:

transmit the feedback message via a physical uplink control channel or a physical uplink shared channel.

17. The apparatus of claim 11, wherein the instructions are further executable by the processor to cause the apparatus to:

transmit the feedback message using a first set of frequency resources; and receive data using a second set of frequency resources different from the first set of frequency resources, wherein transmitting the feedback message, and receiving the data occurs concurrently via a full-duplex mode of the apparatus.

18. The apparatus of claim 11, wherein the instructions are further executable by the processor to cause the apparatus to:

receive a control message indicating a set of information for processing the first demodulation reference signal and the second demodulation reference signal.

19. The apparatus of claim 11, wherein the first set of precoding parameters is different from the second set of precoding parameters associated with the second demodulation reference signal.

20. The apparatus of claim 11, wherein the channel estimation information comprises a set of coefficients associated with a precoded channel response.

21. A method for wireless communications, at a network entity, comprising:

transmitting, via a first time slot, a first demodulation reference signal that is precoded according to a first set of precoding parameters for a user equipment (UE);

transmitting, via the first time slot, a second demodulation reference signal that is precoded according to a second set of precoding parameters for the UE;

receiving a feedback message indicating channel estimation information for the UE based at least in part on the first demodulation reference signal and the second demodulation reference signal;

performing, based at least in part on the feedback message and one or more other feedback messages for the UE, a channel prediction procedure for a second time slot subsequent to the first time slot; and transmitting, via the second time slot, one or more messages that are precoded according to a third set of precoding parameters, the third set of precoding parameters predicted based at least in part on the channel estimation information and the channel prediction procedure.

22. The method of claim 21, wherein performing the channel prediction procedure comprises:

predicting, for the second time slot, a channel response vector based at least in part on a set of channel coefficients indicated by the channel estimation information, the channel response vector associated with one or more antenna ports of a set of antenna ports; and generating the third set of precoding parameters based at least in part on the channel response vector, the one or more messages precoded in accordance with the third set of precoding parameters.

23. The method of claim 22, wherein predicting the channel response vector comprises:

combining one or more previous channel estimation information associated with the one or more antenna ports of the set of antenna ports, the one or more previous channel estimation information associated with the one or more other feedback messages.

24. The method of claim 21, further comprising:

receiving, prior to receiving the feedback message, the one or more other feedback messages, wherein the feedback message and each feedback message of the one or more other feedback messages is associated with a respective time slot prior to the first time slot.

25. The method of claim 24, wherein transmitting the one or more messages comprises:

transmitting, via the second time slot, the one or more messages based at least in part on receiving the one or more other feedback messages.

26. The method of claim 21, further comprising:

transmitting a control message indicating a set of information for processing the first demodulation reference signal for decoding at the UE and processing the second demodulation reference signal.

27. The method of claim 21, wherein the first set of precoding parameters is different from the second set of precoding parameters associated with the second demodulation reference signal.

28. The method of claim 21, further comprising:

transmitting, via the first time slot, a first set of demodulation reference signals precoded according to the first set of precoding parameters, wherein each demodulation reference signal of the first set of demodulation reference signals is associated with a respective UE of a set of UEs that includes the UE;

transmitting, via the first time slot, a second set of demodulation reference signals precoded according to the second set of precoding parameters, wherein each demodulation reference signal of the second set of demodulation reference signals is associated with a respective UE of the set of UEs; and receiving, from the set of UEs, respective feedback messages indicating respective channel estimation information based at least in part on the first set of demodulation reference signals and the second set of demodulation reference signals.

29. The method of claim 28, further comprising:

generating a multi-user multi-input and multi-output (MU-MIMO) channel prediction based at least in part on the respective feedback messages; and generating a MU-MIMO channel precoder associated with the set of UEs based at least in part on the MU-MIMO channel prediction.

30. A method for wireless communications, at a user equipment (UE) comprising:

receiving, via a first time slot, a first demodulation reference signal that is precoded according to a first set of precoding parameters;

receiving, via the first time slot, a second demodulation reference signal that is precoded according to a second set of precoding parameters;

transmitting a feedback message indicating channel estimation information for the UE based at least in part on the first demodulation reference signal and the second demodulation reference signal; and receiving, via a second time slot subsequent to the first time slot, one or more messages that are precoded according to a third set of precoding parameters, the third set of precoding parameters predicted based at least in part on the channel estimation information and a channel prediction procedure of a network entity.

* * * * *